US007865598B2

(12) United States Patent
Denker et al.

(10) Patent No.: US 7,865,598 B2
(45) Date of Patent: Jan. 4, 2011

(54) SYSTEMS AND METHODS FOR PROVIDING RESOURCE ALLOCATION IN A NETWORKED ENVIRONMENT

(75) Inventors: Dennis Denker, Scottsdale, AZ (US); Kip Levin, Los Angeles, CA (US); David Scarborough, Ashburn, VA (US)

(73) Assignee: Ticketmaster LLC, West Hollywood, CA (US)

( * ) Notice: Subject to any disclaimer, the term of this patent is extended or adjusted under 35 U.S.C. 154(b) by 161 days.

(21) Appl. No.: 12/187,295

(22) Filed: Aug. 6, 2008

(65) Prior Publication Data
US 2009/0177776 A1 Jul. 9, 2009

Related U.S. Application Data

(60) Provisional application No. 60/954,534, filed on Aug. 7, 2007.

(51) Int. Cl.
G06F 15/173 (2006.01)
(52) U.S. Cl. .................. 709/226; 709/203; 709/217; 709/225; 709/229
(58) Field of Classification Search .......... 709/203, 709/217, 225, 226, 229
See application file for complete search history.

(56) References Cited

U.S. PATENT DOCUMENTS

| | | |
|---|---|---|
| 5,408,417 A | 4/1995 | Wilder |
| 5,724,520 A | 3/1998 | Goheen |
| 5,794,207 A | 8/1998 | Walker et al. |
| 5,794,219 A | 8/1998 | Brown |
| 5,797,126 A | 8/1998 | Helbing et al. |
| 5,797,127 A | 8/1998 | Walker et al. |
| 5,818,914 A | 10/1998 | Fujisaki |
| 5,835,896 A | 11/1998 | Fisher et al. |
| 5,845,265 A | 12/1998 | Woolston |

(Continued)

FOREIGN PATENT DOCUMENTS

AU  2000229843  8/2006

(Continued)

OTHER PUBLICATIONS

International Search Report and Written Opinion; PCT/US08/72364 (filing date: Aug. 6, 2008); mailed Jan. 30, 2009.

(Continued)

Primary Examiner—Michael Won
(74) Attorney, Agent, or Firm—Knobbe, Martens, Olson & Bear LLP

(57) ABSTRACT

Methods and systems for allocating resources, such as computer controlled resources, in a networked system are described. In an example embodiment, a plurality of requests to select one or more resources are received from distributed computer systems over a network at a receiving computer system. The receiving computer system allocates resource selection time windows to at least a portion of the requests based on one or more allocation criteria, and transmits information regarding the allocated resource selection time windows to corresponding requesting computer systems. A load balancer balances request loads among a plurality of servers. A web proxy processor is configured to selectively block or route an inbound user browser request. A cache cluster system is configured to cache data and states for access by other system components.

39 Claims, 14 Drawing Sheets

U.S. PATENT DOCUMENTS

| | | | |
|---|---|---|---|
| 6,023,685 | A | 2/2000 | Brett et al. |
| 6,047,264 | A | 4/2000 | Fisher et al. |
| 6,067,532 | A | 5/2000 | Gebb |
| 6,085,169 | A | 7/2000 | Walker et al. |
| 6,094,640 | A | 7/2000 | Goheen |
| 6,107,932 | A | 8/2000 | Walker et al. |
| 6,240,396 | B1 | 5/2001 | Walker et al. |
| 6,243,691 | B1 | 6/2001 | Fisher et al. |
| 6,418,415 | B1 | 7/2002 | Walker et al. |
| 6,484,153 | B1 | 11/2002 | Walker et al. |
| 6,496,809 | B1 | 12/2002 | Nakfoor |
| 6,556,548 | B1 | 4/2003 | Kirkby et al. |
| 6,658,390 | B1 | 12/2003 | Walker et al. |
| 6,704,489 | B1* | 3/2004 | Kurauchi et al. ............... 386/46 |
| 6,704,713 | B1 | 3/2004 | Brett |
| 6,829,644 | B2* | 12/2004 | Aufderheide ............... 709/226 |
| 6,873,969 | B2 | 3/2005 | Stone et al. |
| 6,907,405 | B2 | 6/2005 | Brett |
| 6,999,936 | B2 | 2/2006 | Sehr |
| 7,080,030 | B2 | 7/2006 | Eglen et al. |
| 7,110,960 | B2 | 9/2006 | Phillips et al. |
| 7,124,062 | B2* | 10/2006 | Gebhart ..................... 702/186 |
| 7,162,454 | B1 | 1/2007 | Donner et al. |
| 7,171,472 | B2 | 1/2007 | O'Brien et al. |
| 7,177,945 | B2 | 2/2007 | Hong et al. |
| 7,213,754 | B2 | 5/2007 | Eglen et al. |
| 7,228,350 | B2 | 6/2007 | Hong et al. |
| 7,403,993 | B2 | 7/2008 | John et al. |
| 7,555,466 | B2 | 6/2009 | Eglen et al. |
| 7,587,372 | B2 | 9/2009 | Eglen et al. |
| 2002/0174026 | A1 | 11/2002 | Pickover et al. |
| 2003/0093387 | A1 | 5/2003 | Nakfoor |
| 2003/0185197 | A1 | 10/2003 | Banerjee et al. |
| 2005/0021364 | A1 | 1/2005 | Nakfoor |
| 2005/0021365 | A1 | 1/2005 | Nakfoor |
| 2005/0021450 | A1 | 1/2005 | Nakfoor |
| 2005/0027863 | A1 | 2/2005 | Talwar et al. |
| 2005/0138175 | A1 | 6/2005 | Kumar et al. |
| 2005/0139662 | A1 | 6/2005 | Eglen et al. |
| 2005/0144115 | A1 | 6/2005 | Brett |
| 2005/0149458 | A1 | 7/2005 | Eglen et al. |
| 2006/0069780 | A1* | 3/2006 | Batni et al. .................. 709/226 |
| 2006/0095344 | A1 | 5/2006 | Nakfoor |
| 2006/0126201 | A1* | 6/2006 | Jain ............................ 360/15 |
| 2006/0155857 | A1* | 7/2006 | Feenan et al. ............... 709/227 |
| 2006/0208074 | A1 | 9/2006 | Eglen et al. |
| 2006/0271462 | A1 | 11/2006 | Harmon |
| 2006/0277130 | A1 | 12/2006 | Harmon |
| 2007/0022020 | A1 | 1/2007 | Bernstein |
| 2007/0027794 | A1 | 2/2007 | Brett |
| 2007/0027798 | A1 | 2/2007 | Brett |
| 2007/0033131 | A1 | 2/2007 | Brett |
| 2007/0038582 | A1 | 2/2007 | Brett |
| 2007/0055554 | A1 | 3/2007 | Sussman et al. |
| 2007/0087756 | A1 | 4/2007 | Hoffberg |
| 2007/0124232 | A1 | 5/2007 | Brett |
| 2007/0245351 | A1 | 10/2007 | Sussman et al. |
| 2007/0250400 | A1 | 10/2007 | Eglen et al. |
| 2008/0021998 | A1* | 1/2008 | Wentink ..................... 709/226 |
| 2008/0027827 | A1 | 1/2008 | Eglen et al. |
| 2008/0059384 | A1 | 3/2008 | Eglen et al. |
| 2008/0065566 | A1 | 3/2008 | Eglen et al. |
| 2008/0065567 | A1 | 3/2008 | Eglen et al. |
| 2008/0215452 | A1 | 9/2008 | Eglen et al. |
| 2008/0215507 | A1 | 9/2008 | Eglen et al. |
| 2008/0221948 | A1 | 9/2008 | Eglen et al. |
| 2008/0243838 | A1* | 10/2008 | Scott et al. ..................... 707/5 |

FOREIGN PATENT DOCUMENTS

| | | |
|---|---|---|
| AU | 2006203419 | 1/2008 |
| WO | WO 98/10361 | 3/1998 |
| WO | WO 99/06928 | 2/1999 |
| WO | WO 99/18533 | 4/1999 |
| WO | WO 99/38129 | 7/1999 |
| WO | WO 01/03040 A1 | 1/2001 |
| WO | WO 01/52139 A1 | 7/2001 |

OTHER PUBLICATIONS

Hes, et al. "At Face Value" On biometrical identification and privacy, Registratiekamer, Sep. 1999; 78 pages.

Fujimura, "XML Ticket: Generalized Digital Ticket Definition Language", The W3C Signed XML Workshop—Copyright © 1999, 33 pages.

Matsuyama, et al. "Distributed Digital-Ticket Management for Rights Trading System", E-Commerce, 1999; pp. 110-118.

In, Shirley Siu Weng, "*A Proposed* Electronic Ticket Management for trading Service in Internet", Feb. 9, 2001; 7 pages.

Article from Smart Card News, "Major Players Form Proton World International", Aug. 1998, pp. 141-160.

Fujimura, et al. "General-purpose Digital Ticket Framework", NTT Information and Communication Systems Labs, USENIX Workshop on Electronic Commerce; Aug. 31-Sep. 1998.

Fujimura, et al. "Digital-Ticket-Controlled Digital Ticket Circulation", NTT Information Sharing Platform Laboratories, USENIX Security Symposium, Aug. 23-26, 1999.

Chui, et al. "Auction on the Internate—A Preliminary Study", Department of Marketing, HK Univiersity of Science and Technology; 1999, pp. 1-7.

Asokan, et al. "SEMPER Consortium: Advanced Services, Architecture and Design", Deliverable D10 of ACTS Project AC026, Mar. 15, 1999.

U.S. Appl. No. 09/702,794, filed Nov. 1, 2000.

International Search Report and Written Opinion (dated Apr. 11, 2008); International Application No. PCT/US07/86651; Filed Dec. 6, 2007.

Article from Website; Tech Web; "Byter Up: Ballparks Go High-Tech"; Mar. 31, 1999 (4 pages).

Article from Website; Sports Venue Technology; "Pacific Bell Park, San Francisco"; (5 pages).

"Acteva and Enspot.com Sign Agreement to Provide On-Line Ticketing, Broader Distribution", Business Wire (Dec. 3, 1999).

"AuctionNet Still One-Of-A-Kind", Automotive News, S12 (Sep. 20, 1993).

"Cathay Pacific Airways Auctions a Boeing 747-400 Worth of Seats in Third Cybertraveler Auction", Business Wire (Apr. 29, 1996).

"Cathay Pacific Airways-USA Receives More than 1,300 Bids During First Five Days of CyberAuction", Business Wire (Oct. 18, 1995).

"Cathay Pacific Airways-USA to Hold First-Ever Internet CyberAuction", Business Wire (Sep. 26, 1995).

"E-TicketBoard Launches PSL Xchange for Eight NFL Teams", PR Newswire (Jul. 18, 2000).

"E-TicketBoard Launches Revolutionary New Site—SeatsandSuites", PR Newswire (Oct. 17. 2000).

"Keyware Unveils Multi-Application Smart Card Suite", Card News, vol. 16, No. 10 (May 30, 2001).

"Online Movie Ticket Site Launched in China", China Online (Dec. 23, 1999).

"OnSale Brings Thrill of the Auction to the Web", Link-up p. 34 (Jul./Aug. 1995).

"Season Ticket Solutions Announces Availability of Ticket Exchange for Sporting Teams and Entertainment Venues", Business Wire (Jul. 30, 2001).

"WBGH to Hold Online Computer Auction", Link-Up, p. 10 (Sep./Oct. 1988).

Banâtre, "Distributed Auction Bidding System", International Computing Symposium, vol. 4, No. 4 (Aug. 1981).

Banks, "PSL Put Owners on the Hot Seat", St. Petersburg Times, p. 10C (Oct 31, 1993).

Beam et al, "Electronic Negotiation through Internet-Based Auctions", CITM Working Paper 96-WP-1019, http://haas.berkeley.edu/citm/publications/papers/wp-1019.pdf (Dec. 1996).

Blau, "Dormitories See Departure from Previous Years' Trends", The Tech, vol. 116, No. 38 (Aug. 30, 1996).
Boyes et al, "Auctions as an Allocation Mechanism in Academia: The Case of Faculty Offices", Journal of Economic Perspectives, vol. 3, No. 3, pp. 37-40 (Summer 1989).
Collier, "Columbia, S.C.-Based Internet Firm Helps Buy, Sell Sports Tickets", The State, (Oct. 23, 2000).
Dickey, "Raider PSL Without Permanent Place", San Francisco Chronicle, p. B2 (Jun. 26, 1997).
Dickey, "Raiders' PSLs May Be for Life", San Francisco Chronicle, p. D5 (Mar. 26, 1997).
Fisher, "Secondary Market in Consolidation Mode", Street & Smith's Sports Business Journal, p. 3 (Jul. 23, 2007).
Flint, "Cyber Hope or Cyber Hype?", Air Transport World (Oct. 1996).
Garza, "Space Cruise", Reason (May 2000).
Happel, et al.; "Creating a Futures Market for Major Event Tickets: Problems and Prospects"; *Cato Journal*, vol. 21, No. 3; 2002 (pp. 443-461.
Harlan, "At Least it isn't the Team's Ball that's in Somebody Else's Court", Wall Street Journal (Jun. 4, 1991).
Holbrook, "Oakland, Calif., Professional Football Team Sees Gain in Seat License Sales", Contra Costa Times (Feb. 26, 2001).
Hylton, "Dorm Lottery Starts Strong", The Tech, vol. 114, No. 34 (Aug. 29, 1994).
Jackson, "Media Futures: This Bazaar Could Put Retailers Under the Hammer", Financial Times (May 25, 1995).
Jenkins, "Giants Draw Fans into Web Team Helps Season-Ticket Holders Get Mileage Out of Plans", USA Today, p. 3C (Jun. 27, 2000).
Kasper, "Purchase Griz Playoff Tickets Now", Missoulian Online (May 3, 2001).
Koenig, "Texas Firm Links Sports Teams, Fans", Amarillo Globe-News, Feb. 20, 2000).
Kravets, "Going, Going, Gone! Real Estate Auctions in the 90s", Probate & Property, p. 38 (May/Jun. 1993).
Kroll et al, "The Commodity Futures Market Guide", Harper and Row, pp. 9-10 (1973).
Kumar, "With Stars in their Eyes, Travelers Look to Space", St. Petersburg Times, p. 1A (Jun. 11, 2000).
Labuszewski et al, "Inside the Commodity Option Markets", John Wiley & Sons, pp. 19-21 (1985).
Liao, "Sloan's Class Priority System Set to Go", The Tech, vol. 116, No. 25 (May 10, 1996).
Martin, "LiquidSeats Helps Fill the House, Sans Scalping" cnn.com, (Dec. 14, 2000).
Matsumoto et al, "Feasibility of Space Tourism 'Cost Study for Space Tour'", Proceedings of 40th IAF Congress, Paper IAF-89-700 (1989).
Menezes et al, "Simultaneous Pooled Auctions", The Journal of Real Estate Finance and Economics, vol. 17(3), pp. 219-232 (Nov. 19, 1996).
Moldovanu et al, "The Optimal Allocation of Prizes in Contests", http://www.sfb504.uni-mannheim.de/publications/dp99-75.pdf (Jul. 14, 1999).
Muret, "More Teams Gearing up to Offer Option of Stored-Credit Tickets", Street & Smith's Sports Business Journal, p. 12 (Jul. 9, 2007).
Nestor et al, "Transforming Tickets from a Commodity into a Valuable Strategic Asset", Global eTicket Exchange whitepaper, Oct. 13, 2000.
O'Neil, "Q and A", St. Louis Post-Dispatch, p. 4D (Jan. 19, 1995).
Pelline, "Cathay Pacific to Auction Off Airline Tickets on the Internet", San Francisco Chronicle, p. C4 (Apr. 30, 1996).
Riley et al, "Optimal Auctions", The American Economic Review, vol. 71, No. 3, pp. 381-392 (Jun. 1981).
Rosen et al, "Ticket Pricing", University of Chicago Center for the Study of the Economy and the State (Sep. 1995).
Rubel, "ETM to Ticketmaster: Let's Rock", Marketing News (Jun. 19, 1995).
Shulman, "VICS and Quick Response: Priority Issues for Mass Merchandisers", Supermarket Business, vol. 44, No. 10, p. 13(4) (Oct. 1989).
Stevenson, "Frosh Get at Least Fifth Choice Dorm: Women Find Shortage of Single-Sex Rooms", The Tech, vol. 115, No. 37 (Aug. 31, 1995).
Thomas, "Deadline Looms for Playoff Tickets; PSL Owners Have Until Dec. 8 to Make Purchase", St. Louis Post-Dispatch, p. D8 (Dec. 3, 1999).
Vanderporten, "Strategic Behavior in Pooled Condominium Auctions", Journal of Urban Economics 31, pp. 123-137 (1992).
Waddell, "Advantix, Tickets.com Hope Merger Brings Best of Both Ticketing Worlds", Amusement Business (Feb. 8, 1999).
Wagner, "How Retailers are Using Web Auctions to Let Customers Help Them Set Prices", http://www.internetretailer.com/printArticle.asp?id=3164 (Mar. 2001).
Weiner, "Are the Days Numbered for the Paper Ticket?", Street & Smith's Sports Business Journal, p. 17 (Jun. 18, 2007).
www.TicketOptions.com Web Pages, as retreived from archive.org (2001).
wwwSeasonTicket.com Web Pages, as retreived from archive.org (2001).
Zoltak, "Advantix Acquisitions Continue with Protix Deal", Amusement Business (Nov. 2, 1998).
Office Action dated Apr. 7, 2010, U.S. Appl. No. 12/187,272.

* cited by examiner

BON JOVI

Have a Nice Day Tour
Don Haskins Center,
El Paso, TX
Fri, Feb 23, 2007 08:00 PM

I WILL ACCEPT A RIGHT TO SELECT IN THE FOLLOWING GROUP OR BETTER: [ ALL ▼ ]   [ SUBMIT ]

CURRENT MINIMUM BID
$340
SUBMIT BID OF AT LEAST $345

BID FOR RIGHT TO SELECT 1-50: [ ]

CURRENT MINIMUM BID
$230
SUBMIT BID OF AT LEAST $235

BID FOR RIGHT TO SELECT 51-250: [ ]

CURRENT MINIMUM BID
$160
SUBMIT BID OF AT LEAST $165

BID FOR RIGHT TO SELECT 251-1000: [ ]

CURRENT MINIMUM BID
$110
SUBMIT BID OF AT LEAST $115

BID FOR RIGHT TO SELECT 1000-2000: [ ]

CURRENT MINIMUM BID
$65
SUBMIT BID OF AT LEAST $70

[✓] SEND ME AN EMAIL IF MY BID IS NO LONGER A WINNING BID

[✓] SEND ME AN SMS MESSAGE IF MY BID IS NO LONGER A WINNING BID

[ SUBMIT ]

*FIG. 4A*

BON JOVI

Have a Nice Day Tour
Don Haskins Center,
El Paso, TX
Fri, Feb 23, 2007 08:00 PM

YOU CURRENTLY HAVE BIDS SUBMITTED FOR GROUP I (RIGHT TO SELECT 1-50) AND GROUP II (RIGHT TO SELECT 51-250)

I WILL ACCEPT A RIGHT TO SELECT IN THE FOLLOWING GROUP OR BETTER: [ALL ▼]

CURRENT MINIMUM BID
$340
SUBMIT BID OF AT LEAST $345

BID FOR RIGHT TO SELECT 251-1000 [        ]

CURRENT MINIMUM BID
$135
SUBMIT BID OF AT LEAST $140

BID FOR RIGHT TO SELECT 1000-2000 [        ]

CURRENT MINIMUM BID
$95
SUBMIT BID OF AT LEAST $100

[SUBMIT]

*FIG. 4B*

SYSTEMS AND METHODS FOR PROVIDING RESOURCE ALLOCATION IN A NETWORKED ENVIRONMENT

PRIORITY CLAIM

The present application claims priority from U.S. Patent Application No. 60/954,534, filed Aug. 7, 2007, the content of which is incorporated herein in its entirety.

CROSS-REFERENCE TO RELATED APPLICATIONS

This application is related to copending application, entitled SYSTEMS AND METHODS FOR PROVIDING RESOURCE ALLOCATION IN A NETWORKED ENVIRONMENT, application Ser. No. 12/187,294, filed the same day as the present application, and copending application, entitled SYSTEMS AND METHODS FOR PROVIDING RESOURCE ALLOCATION IN A NETWORKED ENVIRONMENT, application Ser. No. 12/187,272, filed the same day as the present application, the contents of which are incorporated herein in their entirety.

A portion of the disclosure of this patent document contains material that is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

STATEMENT REGARDING FEDERALLY SPONSORED R&D

Not applicable.

PARTIES OF JOINT RESEARCH AGREEMENT

Not applicable.

REFERENCE TO SEQUENCE LISTING, TABLE, OR COMPUTER PROGRAM LISTING

Not applicable.

BACKGROUND OF THE INVENTION

1. Field of the Invention

The present invention is related to networked systems, and in particular, to methods and systems for allocating resources in a networked system.

2. Description of the Related Art

Networked systems are often used to provide controlled access to network resources. Such resources are typically in limited supply or availability at a given time. Therefore, different algorithms (e.g., round robin, first-come-first serve, etc.) are conventionally used to allocate resources.

SUMMARY

The present invention is related to networked systems, and in particular, to methods and systems for allocating resources in a networked system.

The following are illustrative example embodiments, and additional, fewer, or different actions and/or components can be utilized.

In an example embodiment, a plurality of requests to select one or more resources are received from distributed computer systems over a network at a receiving computer system. The receiving computer system allocates resource selection time windows to at least a portion of the requests based on one or more allocation criteria, and transmits information regarding the allocated resource selection time windows to corresponding requesting computer systems.

One or more example embodiments described herein provide a method of allocating computer resources, comprising: receiving over a network at a resource allocation system requests for one or more rights to select computer resources from processor-based systems, wherein the requests are associated with corresponding rankable criteria; ranking the requests based on the rankable criteria; storing in computer readable memory rankings for rights to select resources; allocating ranked rights to select resources to the requests based at least in part on the rankable criteria; transmitting over the network information regarding the allocated rights to select to the requesting processor-based systems, the information including time windows in which requesters can perform resource selections; receiving over the network at a first time from a first requester an indication that the first requester wants to make a resource selection; determining if the first requester is authorized to make a resource selection during the first time; if the first requester is authorized to make a resource selection during the first time: enabling the first requester to select a resource; receiving over the network a resource selection from the first requester; removing the selected resource a pool of available resources.

If the first requester is not authorized to make a resource selection during the first time, optionally a denial notification is transmitted over the network to the first requester. By way of example, the denial notification optionally informs the first requester of a time window the first requester is authorized to make a resource selection. By way of non-limiting illustration, the computer resource can include a processor resource, a memory resource, and/or network bandwidth. By way of non-limiting illustration, the ranked criteria optionally relate to something of value being offered by requesters. Optionally, the example method further comprises informing the first requester of an alternate time window if a first time window allocated to the first requester has passed. Optionally, the example method further comprises transmitting to at least one requester a plurality of time windows from which to choose.

One or more example embodiments described herein provide a method of allocating resources, the method comprising: receiving from a first processor-based system over a network at a resource allocation system a first request from a first user for the right to select a resource from a pool of resources, wherein the first request is associated with a first rankable attribute; receiving from a second processor-based systems over the network at the resource allocation system a second request from a second user for the right to select a resource from the pool of resources, wherein the second request is associated with a second rankable attribute; ranking the first request and the second request using at least the first rankable attribute and the second rankable attribute; allocating a first ranked right to select a resource from the pool of resources to the first request and a second ranked right to select a resource from the pool of resources to the second request based at least in part on the ranking of the first request and the ranking of the second request; transmitting to the first user a communication including a first code that identifies the first ranked right to the select; transmitting to the second user a communication including a second code that identifies the second ranked right to the select, wherein the first ranked right to select entitles the first user to make a resource pool selection before second user; receiving over the network at a first time from the first user a first indication that the first user wants to make a resource selection, wherein the first indication is associated with the first code; determining if the first user is authorized to make a resource selection during the first time; if the first user is authorized to make a resource selection during the first time, enabling the first user to select at least one resource from the pool of resources; receiving over the network at a second time from the second user a second indication that the second user wants to make a resource selection, wherein the second indication is associated with the second code; determining if the second user is authorized to make a resource selection during the first time; and if the second user is authorized to make a resource selection during the first time, enabling the second user to select a resource from the pool of resources.

Optionally, the example method further comprises receiving over the network a resource selection from the first user; and removing the selected resource the pool of resources. Optionally, the example method further comprises transmitting the selected resource to the first processor-based system over the network. Optionally, the example method further comprises transmitting a token corresponding to the selected resource to the first user. Optionally, if the first user is not authorized to make a resource selection during the first time, a denial notification is transmitted to the first user. Optionally, the denial notification informs the first user of the time window the first user is authorized to make a resource selection. By way of further example, optionally the pool of resources includes the right to use a physical location and/or a memory resource. By way of illustration and not limitation, optionally the first request is received as an auction submission. By way of illustration and not limitation, optionally the first criterion relates to an item of value. Optionally, the example method further comprises informing the first user of an alternate time window if a first time window assigned to the first user has passed. Optionally, the example method further comprises transmitting to the first user a plurality of time windows from which the first user can select.

An example resource allocation system, comprises a first network interface; a database storing information regarding a plurality of resources, including rights to select resources rankings; and program code stored in computer readable memory, which, when executed is configured to: receive requests from users for the right to select a resource from a pool of resources, wherein the requests are associated with corresponding rankable attributes; rank the users' requests based at least on the corresponding rankable attributes; allocate the ranked rights to select resources to at least a portion of the requests based at least in part on the ranking of the users' requests.

Optionally, the program code, when executed is further configured to transmit to a first user a communication including a first code that identifies a first right to the select. Optionally, the program code, when executed is further configured to: receive from the first user a first indication that the first user wants to make a resource selection, wherein the first indication is associated with the first code is provided at a first time; and determine if the first user is authorized to make a resource selection based at least in part on the first time. Optionally, the program code, when executed is further configured to transmit a denial notification to the first requester (e.g., via email, instant message, SMS message, etc.). By way of illustration, optionally the denial notification is configured to indicate that the first user is not authorized to make a resource selection at the first time. Optionally, the program code, when executed is further configured to transmit to at least one user a plurality of time windows from which to select.

One or more example embodiments described herein provide a method of adjusting an item price, comprising: posting a plurality of items in an online auction; receiving over a network a plurality of bids from corresponding users, wherein each of the plurality of bids is associated with a bid amount; determining using a processor-based system which of the plurality of users are winning bidders; and determining what the winning bidders are to pay for the corresponding bid for items based at least in part on how many bids were received, how many items are allocated to a plurality of winning bidders, and/or how many unallocated items are available, wherein at least a portion of the winning bidders are to pay an amount different than their corresponding bid amount. By way of illustration, optionally the act of determining what the winning bidders are to pay further comprises increasing a bid amount of at least one user by a first percentage. Optionally, the method further comprises requesting, prior to the auction close, a first user via a user interface to agree that after the auction close a price that the first user is to pay for a first bid for item can be adjusted from a first bid amount submitted by the first user based at least part on the actions of others. By way of illustration, the act of determining what the winning bidders are to pay further optionally comprises determining a central tendency of the bid amounts corresponding to at least a portion of the bids. For example, the central tendency is calculated at least in part by calculating an average of at least a portion of the bid amounts, a median of at least a portion the bid amounts, a trimedian of at least a portion the bid amounts, by a mode of at least a portion the bid amounts, and/or a mean of at least a portion the bid amounts (e.g., wherein the mean is a quadratic mean, a generalized mean, a weighted mean, a truncated mean, a midrange, a Winsorized mean, an exponential mean, a trimean, or a normalized mean). In an example embodiment, the act of determining what the winning bidders are to pay further comprises determining that at least one user is to pay less than a bid amount received from the at least one user. Optionally, the method further comprises storing an adjustment limit in computer readable memory, wherein the adjustment limit indicates how much an amount winning bidders are to pay can vary from their corresponding bid amounts (e.g., wherein the adjustment limit is expressed as a percentage, a currency amount, etc.). Optionally, the method further comprises ranking the items. Optionally, the method further comprises ranking the received bids. Optionally, the method further comprises ranking the received bids; ranking the items; allocating items to winning bidders based at least in part on the ranking of the received bids and the ranking of the items.

One or more example embodiments described herein provide a method of adjusting an item price: posting a plurality of items for sale online; receiving over a network a plurality of purchase offers for items from corresponding users, wherein the plurality of purchase offers are associated with corresponding offer amounts; and determining what at least a portion of the users are to pay for the items based at least in part on how many purchase offers were received, how many items are allocated to users, and/or how many unallocated items are available, wherein one or more of the users are to pay an amount different than their corresponding offer amount. Optionally, the online sale is in the form of an auction. Optionally, the purchase offers are in the form of bids. Optionally, the act of determining what the users are to pay further comprises increasing a purchase offer amount of at least one user by a first percentage. Optionally, the method further comprises requesting a first user via a user interface to agree that a price that the first user is to pay for a first item can be adjusted from a first offer amount based at least in part on the acts of others. Optionally, the act of determining what the users are to pay further comprises determining a central tendency of the offer amounts. For example, the central tendency is calculated at least in part by calculating an average of the bid amounts, a median of the bid amounts, a trimedian of the bid amount, a mode of the bid amounts, and/or a mean of the bid amounts (e.g., wherein the mean is a quadratic mean, a generalized mean, a weighted mean, a truncated mean, a midrange, a Winsorized mean, an exponential mean, a trimean, a normalized mean, etc.). Optionally, the act of determining what the users are to pay further comprises determining that at least one user is to pay less than an offer amount received from the at least one user. Optionally, the method further comprises storing an adjustment limit in computer readable memory, wherein the adjustment limit indicates how much at least a portion of the users are to pay can vary from corresponding offer amounts. Optionally, the adjustment limit is expressed as a percentage and/or a currency amount. Optionally, the method further comprises ranking the items. Optionally, the method further comprises ranking the received offers. Optionally, the method further comprises ranking the received offers; ranking the items; allocating items to users based at least in part on the ranking of the received offers and the ranking of the items.

An example resource allocation system comprises: a first network interface; a database storing information regarding a plurality of items; and program code stored in computer readable memory, which, when executed is configured to: receive a plurality of purchase offers for items from corresponding users, wherein the plurality of purchase offers are associated with corresponding offer amounts; and determine what the users are to pay for the items based at least in part on how many purchase offers were received, how many items are allocated to users, and/or how many unallocated items are available, wherein at least a portion of the users are to pay an amount different than their corresponding offer amount.

Optionally, the program code, when executed is further configured to provide the online sale in the form of an auction. Optionally, the purchase offers are in the form of bids. Optionally, the program code, when executed is further configured to increase a purchase offer amount of at least one user by a first percentage. Optionally, the program code, when executed is further configured to request a first user to agree that a price that the first user is to pay for a first item can be adjusted from a first offer amount. Optionally, the program code, when executed is further configured to determine what the users are to pay using a central tendency of the offer amounts. Optionally, the central tendency is calculated at least in part by calculating an average of the bid amounts, a median of the bid amounts, a trimedian of the bid amounts, a mode of the bid amounts and/or a mean of the bid amounts. For example, the mean can be a quadratic mean, a generalized mean, a weighted mean, a truncated mean, a midrange, a Winsorized mean, an exponential mean, a trimean, or a normalized mean. Optionally, the program code is further configured to store an adjustment limit in computer readable memory, wherein the adjustment limit indicates how much at least a portion of the users are to pay can vary from their corresponding offer amounts. For example, the adjustment limit is optionally expressed as a percentage or a currency amount. Optionally, the program code is further configured to store a ranking of the items. Optionally, the program code is further configured to: store a ranking of the received offers; store a ranking of the items; and allocate items to users based at least in part on the ranking of the received offers and the ranking of the items.

One or more example embodiments described herein provide a method of reallocating items, the method comprising: during a first session, receiving at a first computer system a purchase request from a user for a first item over a network, wherein the purchase request is provided via a Web page displayed on a user terminal; transmitting during the first session from the first computer system to the user terminal an indication that the purchase order is accepted; transmitting during the first session from the first computer system to the user terminal an offer to resell the first item; receiving via the user terminal during the first session an indication that the user wants to resell the first item; and receiving via the user terminal during the first session a resale price specified by the user using a second Web page. Optionally, the method further comprises determining if the resale price complies with a first rule; and informing the user if the resale price does not comply with the first rule. For example, the first rule is optionally a venue rule, a performer rule, or a government rule. If the rule is a government rule, optionally the government rule is specified by a government entity associated with the location of a venue which the first item provides access to and/or a government entity associated with a location of the user. Optionally, the first Web page and the second Web page are hosted by the same website. Optionally, the purchase request is provided in the form of an auction bid. Optionally, the purchase request is provided in response to a fixed price offer. Optionally, the offer to resell the first item is transmitted to the user terminal at substantially the same time the indication that the purchase order is accepted is transmitted to the user terminal or substantially immediately thereafter. Optionally, the purchase request is for a plurality of tickets, and the method further comprises receiving an identification from the user as to which of the plurality of tickets are to be resold. Optionally, the user is not asked to provide a password within a time period beginning with the transmission of the indication that the purchase order is accepted and the transmission of the offer to resell. Optionally, the method further comprises inhibiting the user's ability to utilize the first item after a purchaser purchases the first item (e.g., wherein the first item is a right to enter an event venue, and inhibiting the user's ability to utilize the first item includes invalidating an event ticket provided to the user, wherein a new event ticket is issued to the purchaser wherein a new event ticket is transmitted to a telephonic device associated with the purchaser. wherein a new event ticket is transmitted to a terminal associated with the purchaser, etc.). Optionally, the user purchases a plurality of items including the first item during the first session, the method further comprising providing a user interface to the user via which the user can selectively indicate which of the plurality of items are to be resold and which are not be resold. Optionally, the method further comprises storing an indication from a first user that as an overridable default, future items purchased by the first user are to be posted for resale. Optionally, the method further comprises determining for a first user whether the first user has to wait a specified period of time before posting a second item for resale. Optionally, the method further comprises determining for a first user whether a first quantity of items that the first user has indicated are to be resold exceeds a quantity limit, and if the first quantity exceeds the quantity limit, inhibiting the resale of the first quantity of items. Optionally, the second item is a ticket. Optionally, the method further comprises determining for a first user whether the first user is permitted to resell items via the first computer system. Optionally, the first session is associated with a session identifier stored on the user terminal. Optionally, the first session is associated with a session identifier stored on the user terminal by the first computer system during the first session prior to transmitting to the user terminal the offer to resell the first item, and wherein the first computer system receives the session identifier from the user terminal after transmitting to the user terminal the offer to resell the first item.

One or more example embodiments described herein provide a method of reallocating items, the method comprising: receiving at a first system a purchase request from a terminal associated user for a first item over a network; receiving at the first system a user password from the user terminal; transmitting to the user terminal an indication that the purchase order is accepted after verifying the user password; automatically transmitting from the first system to the user terminal an offer to resell the first item, wherein the user does not have to reenter the user password in order to provide a resell indication; receiving via the user terminal an indication that the user wants to resell the first item; and receiving via the user terminal a resale price specified by the user.

Optionally, the method further comprises determining if the resale price complies with a first rule; and informing the user if the resale price does not comply with the first rule. Optionally, the first rule is a venue rule, a performer rule, and/or a government rule. For example, the government rule is optionally specified by a government entity associated with the location of a venue which the first item provides access to and/or a government entity associated with the location of the user. Optionally, the indication that the purchase order is accepted and the offer to resell are provided via the same website. Optionally, the purchase request is provided in the form of an auction bid. Optionally, the purchase request is provided in response to a fixed price offer. Optionally, the offer to resell the first item is transmitted to the user terminal at substantially the same time the indication that the purchase order is accepted is transmitted to the user terminal. Optionally, the offer to resell the first item is transmitted at substantially immediately after the indication that the purchase order is accepted is transmitted to the user terminal. Optionally, the purchase request is for a plurality of tickets, the method further comprising receiving an identification from the user as to which of the plurality of tickets is to be resold. Optionally, the method further comprises inhibiting the user's ability to utilize the first item after a purchaser purchases the first item via an online posting. Optionally, the first item is a right to enter an event venue, and inhibiting the user's ability to utilize the first item includes invalidating an event ticket provided to the user. Optionally, a new event ticket is issued to the purchaser. Optionally, a new event ticket is transmitted to a telephonic device associated with the purchaser. Optionally, a new event ticket is transmitted to a terminal associated with the purchaser. Optionally, a new event ticket is stored in a user smart card. Optionally, the user purchases a plurality of items including the first item during a first session, and the method further comprising providing a user interface to the user via which the user can selectively indicate which of the plurality of items are to be resold and which are not be resold. Optionally, the method further comprises storing an indication from a first user that as an overrideable default, future items purchased by the first user are to be posted for resale. Optionally, the method further comprises determining for a first user whether the first user has to wait a specified period of time before posting a second item for resale. Optionally, the method further comprises determining for a first user whether a first quantity of items that the first user has indicated are to be resold exceeds a quantity limit, and if the first quantity exceeds the quantity limit, inhibiting the resale of the first quantity of items. Optionally, the second item is a ticket. Optionally, the method further comprises determining for a first user whether the first user is permitted to resell items via the first system. Optionally, the offer to resell the first item is transmitted during the same Web session that the indication that the purchase order is accepted is transmitted to the user terminal. Optionally, the first session is associated with a session identifier stored on the user terminal. Optionally, the first session is associated with a session identifier stored on the user terminal by the first system prior to transmitting to the user terminal the offer to resell the first item, and wherein the first system receives the session identifier from the user terminal after transmitting to the user terminal the offer to resell the first item.

An example embodiment provides a resource allocation system, comprising: a first network interface; a database storing information regarding a plurality of items; and program code stored in computer readable memory, which, when executed, is configured to: store a session identifier on a user terminal; process a purchase request for an item from the user terminal; transmit to the user terminal an indication that the purchase order is accepted if the purchaser order meets predefined criteria; if the purchase order is accepted: automatically transmit to the user terminal an offer to resell the item; receive the session identifier from the user terminal; use the session identifier for identification; determine if a resell instruction has been received from the user terminal.

Optionally, the program code is further configured to transmit to the user terminal a user interface via which a resale price can be specified. Optionally, the program code is further configured to determine if the resale price complies with a first rule; and transmit to the user terminal a notification if the resale price does not comply with the first rule. Optionally, the first rule is a venue rule. Optionally, the first rule is a performer rule and/or a government rule (e.g., where the government rule is specified by a government entity associated with the location of a venue which the item provides access to and/or the government rule is specified by a government entity associated with the location of the user). Optionally, the system hosts a website configured to provide the indication that the purchase order is accepted and the offer to resell. Optionally, the system is configured to receive the purchase request in the form of an auction bid. Optionally, the system is configured to receive the purchase request in the form of a fixed price offer. Optionally, the system is configured to provide the offer to resell at substantially the same time the indication that the purchase order is accepted is transmitted to the user terminal or substantially immediately thereafter. Optionally, the program code is further configured to inhibit the ability to utilize the item after a purchaser purchases the item. Optionally, the item is a right to enter an event venue, and inhibiting the user's ability to utilize the item includes invalidating an event ticket provided to the user. Optionally, the program code is further configured to provide a new event ticket to the purchaser. Optionally, the program code is further configured to provide new event ticket to a telephonic device associated with the purchaser. Optionally, the program code is further configured to provide a new event ticket to a terminal associated with the purchaser. Optionally, the program code is further configured to determine for a first user whether the first user has to wait a specified period of time before posting a second item for resale. Optionally, the program code is further configured to determine for a first user whether a first quantity of items that the first user has indicated are to be resold exceeds a quantity limit, and if the first quantity exceeds the quantity limit, inhibit the resale of the first quantity of items. Optionally, the second item is a ticket. Optionally, the program code is further configured to determine for a first user whether the first user is allowed to resell items via the first computer system.

BRIEF DESCRIPTION OF THE DRAWINGS

Embodiments of the present invention will now be described with reference to the drawings summarized below. These drawings and the associated description are provided to illustrate example embodiments of the invention, and not to limit the scope of the invention.

FIGS. 4A-7 illustrate example user interfaces.

DETAILED DESCRIPTION OF PREFERRED EMBODIMENTS

Figures 1, 1A:
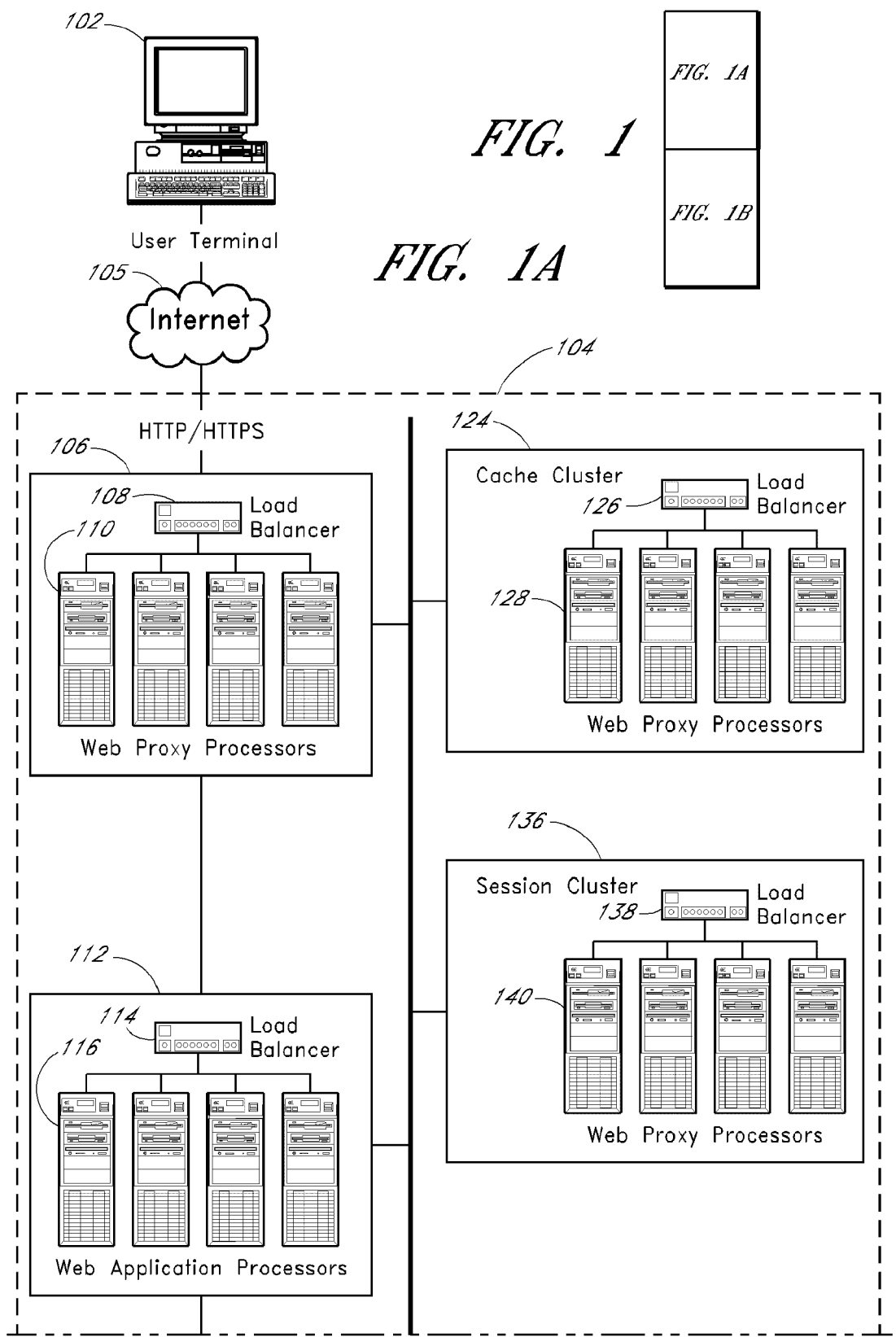
FIGS. 1A-B illustrate an example system embodiment that can be used in conjunction with processes described herein.

The processes and systems described herein can provide an enhanced technique for allocating resources via a networked computer system. For example, certain embodiments more efficiently allocate resources in accordance with resource requests. Certain embodiments enable a resource requester to reallocate resources so that the resources are allocated to a relatively higher value use.

Unless otherwise indicated, the functions described herein may be performed by software modules including executable code and instructions running on one or more general-purpose computers. The computers can include one or more central processing units (CPUs) that execute program code and process data, memory, including one or more of volatile memory, such as random access memory (RAM) for temporarily storing data and data structures during program execution, non-volatile memory, such as a hard disc drive, optical drive, or FLASH drive, for storing programs and data, including databases, which may be referred to as a "system database," and a wired and/or wireless network interface for accessing an intranet and/or Internet.

In addition, the computers can include a display for displaying user interfaces, data, and the like, and one or more user input devices, such as a keyboard, mouse, pointing device, microphone and/or the like, used to navigate, provide commands, enter information, provide search queries, and/or the like. However, the systems described herein can also be implemented using special purpose computers, terminals, state machines, and/or hardwired electronic circuits.

Further, the example processes described herein do not necessarily have to be performed in the described sequence, and not all states have to be reached or performed. In addition, certain process states that are illustrated or described as being serially performed herein, can be performed in parallel.

Throughout the following description, the term "Web site" is used to refer to a user-accessible server site that implements basic and/or other World Wide Web standards for the coding and transmission of documents, such as hypertextual documents. These standards currently include HTML (the Hypertext Markup Language), which can be used to generate Web pages, and HTTP (the Hypertext Transfer Protocol). It should be understood that the term "site" or "computer system" are not intended to imply a single geographic location, as a Web or other network site can, for example, include multiple geographically-distributed computer systems that are appropriately linked together. Furthermore, while the following description relates to an embodiment utilizing the Internet and related protocols, other networks, such as a network of interactive televisions, wireless phones, and other protocols, may be used as well.

While the following discussion may often relate to computer resources (e.g., processor time, network bandwidth, database access) or tickets (e.g., a voucher to indicate that one has paid for or is entitled to admission to a theatre, concert, amusement park, zoo, aquarium, museum, concert, or other attraction, or entitled to travel on an airplane, public transit, train, or other mode of transportation, and may indicate that the holder is entitled to use a specific seat) in order to illustrate the use and application of the disclosed systems and methods, the disclosed systems and methods can be applied to other types of units, inventory, or finite resources, such as products or other priority rights.

The resource allocation computer system described herein can include auction servers, account manager servers, a credit card authorization system, an internal network, request routers, resource request, data and status queues, and an interface to the Internet. The resource allocation computer system can host a Web site, accessible by users, for selling/auctioning off resources, such as computer resources, tickets, the right to select seat tickets (e.g., the right to select one seat, two seats, or other specified number of seats), a contingent rights (e.g., the right to purchase playoff tickets if the corresponding team makes the playoffs, the right to purchase a commodity, etc.), the right to use and/or select computer resources (e.g., processors, memory, network bandwidth) or other resources or inventory.

The resource allocation computer system can include one or more databases whose data can be accessed by authorized systems/persons as needed and available. For example, the databases can include a user account database, that stores user contact information (e.g., Internet protocol addresses, delivery address, billing address, email addresses, physical mailing addresses, phone addresses, instant messaging addresses, etc.), billing information (e.g., credit card, debit card, bank account numbers and/or other information), preferences, account status, and the like, that can be accessed by other portions of the resource allocation computer system, such as by account manager servers.

The computer system can optionally include a front end switching network, a state and information data cache which can be stored in a set of servers that forms a high capacity front end, a set of servers that includes application servers, a set of servers responsible for controlling queues of transactional users/customers, and a core resource allocation server system. For example there can be request queues for Internet users and/or for phone users. The requests can be received as packets (e.g., including a header, payload, and trailer). The packets can include error detection and correction codes, such as a checksum, a CRC (cyclic redundancy check), or parity bits.

Where the resources include or are related to tickets (e.g., the right to select a ticket), one or more ticket databases accessible by the resource allocation computer system are provided that store ticket information records for tickets, including, for example, some or all of the following information: barcode information, event name, event date, seat identifier, ticket holder name or other identifier of a current ticket holder, names or other identifiers of past holders of the ticket, a ticket valid/invalid indicator, and an indicator as to whether the ticket has been used. In addition, an event database can be provided that stores information regarding events, including the venue, artist, date, time, and the like. Not all of the foregoing systems and components need to be included in the system and other systems and architectures can be used as well.

Where the resources being allocated are computer resources, one or more databases can store information identifying the resources being allocated (e.g., computer systems, processing time, network bandwidth, database access), and historical usage information regarding those resources. Optionally, photographs, videos, sound recordings, and/or drawings of the resources can be stored. For example, event venue seating charts and photographs/videos of views from seats can be stored in one or more databases hosted by one or more servers or other computer systems.

In an example embodiment, a networked resource allocation computer system is used to provide resource distributions to resource requesters or to recipients designated by resource requesters. By way of example, a resource can be in the form of a right, such as a right (e.g., a voucher) to attend an event (e.g., a general admission event, a party, a gallery showing, etc.), a right to attend an event and utilize a specific area (such as a section, a specific seat, a specific venue entrance, a backstage area, or a parking area or spot) at the event (e.g., a concert, a sporting event, a movie, a play, an exhibit, a banquet, etc., a right (e.g., a voucher) to access a form of transportation (an airplane, train, bus, or boat ride), a right to select an associated resource (e.g., a right to attend an event and pick a seat or seating area for the event, a right to pick an edition number for a limited addition artwork or other limited edition product, a right select the time computer resources can be accessed, a right to select which computer resource is to be utilized at a specified period of time, etc.), a right to obtain a product, a right to perform an activity at a specific location and/or use a location as a specific a time (e.g., a right to enter a location at a specific time or range of times, a right to golf tee time, a right to use a bowling alley lane or other sports venue at a specific time or range of times, a right to a restaurant reservation at a specific date and/or time, a right to a hotel room for a specified period of time, etc.).

For example, in a ranked-seat auction, winning bidders are provided with a time window in which they may choose their own seats, thereby eliminating or reducing problems associated with attempts of determining the "best" seats in a particular venue. This can be performed for individual seats and/or for blocks of winning seats. By way of further example, the right to select the time a user (e.g., a human or computer system) can access designated computer resources can likewise be auctioned.

A distribution of resources can be provided in an auction format (e.g., an English auction, a multi-unit English ascending auction, a Dutch Auction, a first-price sealed-bid auction, a sealed-bid second-price auction, an all-pay auction, a buy out auction, a combinatorial auction, an absolute auction, etc.) and/or at a fixed price sale format. Different auction types can be used to allocate different sets of resources in a set or resources. For example, a first set of seats or rights to select seats for a first event are auctioned using a first auction format, and a second set of seats or rights to select seats for the first event and/or a different event are auctioned using a second auction format. The auction formats can be selected (e.g., via a computer-based form, written or oral instruction or otherwise) by a seller, a venue operator, a performer, or other appropriate authorized entity.

By way of example, the seller can optionally be acting as a resource issuer, such as a ticket issuer (such as an artist, sports team, event producer, or venue), as an agent for the issuer, or as a reseller, such as a secondary market reseller where the seller had purchased the resources from a source, such as a primary market ticket seller, and is reselling the purchased tickets to others.

Several example auction formats will now be discussed. In an English auction, bidders bid openly, with each bid being higher than the previous bid. The auction operator/seller may set one or more conditions to determine when the auction has ended. For example, the auction may end when no participant is willing to bid higher than the last received bid, when a time deadline is reached, and/or when a pre-determined price is reached, at which point the highest bidder pays the price. The seller may set a reserve price (e.g., wherein if a bid is not received that meets the reserve, the item being auctioned remains unsold). The Dutch auction can also be provided in a silent auction format where the bids are not revealed to other bidders during the auction. In a multi-unit English ascending auction, several identical or similar goods may be sold at the same time to a corresponding number of high bidders.

In a Dutch auction, an initial offer price is set for the item which is lowered until a bidder submits a bid for the current price, or, in certain auctions a predetermined minimum price is reached. That winning bidder pays the last announced price. In a modified Dutch auction or uniform pricing auction, if multiple similar items are offered at auction at the same time, winning bidders will pay the same price (e.g., the lowest winning bid) for their items. For example, in a uniform price auction a number of identical or similar units of an item are sold for the same price. The buyers in the auction bid a maximum price they are willing to pay per item, and the number of units they want to purchase at that price. The bids may be sealed (e.g., not revealed to the other bidders until the auction closes). The auction system allocates one or more items to the highest bidder first, giving the highest bidder the number of units of the item requested, then the second highest bidder and so on until either available items have been allocated to all the winning bids, or all of the allocated items have been allocated. If the items are not identical, then in a modified embodiment, the highest ranked bidders is allocated the highest ranked resource, the second highest ranked resource is allocated the second highest ranked resource and so on. Winning bidders then pay a per unit price equal to the lowest winning bid (the lowest bid out of the buyers who actually received one or more units of the commodity)—regardless of their actual bid. Optionally instead, winners pay the highest losing bid rather than the lowest winning bid.

In a sealed-bid first-price auction for a given item, bidders submit bids and the bids are sealed so that no bidder knows the bid of other bidders. The highest bidder(s) wins the auction and pays their bid. In a sealed-bid second-price auction bidders submit bids and the bids are sealed so that no bidder knows the bid of other bidders. The highest bidder wins the auction and pays the second highest bid rather than the highest bid.

In an all-pay auction, bidders pay their bids regardless of whether they have a winning bid. The highest bidder wins the auction. If there are multiple units being sold, then the highest winning bidders are allocated resources. If the items are not identical, then in a modified embodiment, the highest ranked bidders is allocated the highest ranked resource, the second highest ranked resource is allocated the second highest ranked resource and so on. In a buy-out auction the seller sets a buy-out price in which the bidder can end the auction by accepting the buy-out price. The bidder can choose to bid or use the buy-out option. If no bidder chooses to utilize the buy-out option, the auction ends with the highest bidder winning the auction. In a combinatorial auction, bidders can place bids on combinations of items, or "packages," rather than just individual items. In an absolute auction, the auctioned item passes to the highest bidder regardless of the amount of the highest and last bid.

As similarly discussed above, the right to pick seats for and attend an event can be auctioned using one or more auction formats. The rights to select a seat may be ranked, where the earlier the right, the better the ranking, by way of example. The seller, auction operator, or other entity may also rank some or all bids.

For example, auction bids can be ranked from highest to lowest (with some bids possibly being ranked equally to other bids in certain optional embodiments) according to criteria determined by the seller or otherwise. Examples of such criteria that may be used can include some or all of the following optional criteria: the resource price bid, the quantity of resources in the bid, the time that the bid is placed, the status of the bidder (e.g., if the bidder has won other auctions, has paid for a certain type of membership, is placing the bid using a particular type of credit card (such as an American Express credit card) or other selected payment mechanism, the duration with which the bidder has had a type of membership (e.g., a fan club), or whether the bidder has purchased other products from the seller or specified third parties in the past. Other criteria can be used as well.

Optionally, different criteria can have corresponding weightings in determining a ranking, such as when certain criteria are more important then other criteria in determining a ranking. For example, bids can first be ranked based on the amount of the bid, and if there are ties, then the first received of the tying bids will be given a better rank. Other tie breakers may be used.

By way of illustration, a score that can be used for ranking may be determined using the following example formula:

$$\text{Ranking score equal} = w_1 \text{Criterion}_1 + w_2 \text{Criterion}_2 + \ldots w_{n-1} \text{Criterion}_{n-1} + W_n \text{Criterion}_n$$

where:

w=weighting

Criterion=score for the corresponding criterion

Optionally, the bids can then be ordered according to the respective scores.

In particular, in an example embodiment, if resources and auction bids are ranked, then if so specified by the rules, resources are assigned to bids according to the rankings (e.g., as indicated or determined by weighted or un-weighted criteria scores) of each (for example, the highest ranked resource is assigned to the highest ranked bid, then the second highest ranked resource is assigned to the second highest ranked bid, then the third highest ranked resource is assigned to the third highest ranked bid, etc.) until no more resources remain in the auction to assign to bids, or all bids have been allocated resources. Bids to which resources are assigned are given the status of "Winning Bids" or the like by the system, and bids to which resources are not assigned being given the status of "Losing Bids" or the like (wherein the bidders who placed losing bids will not receive resources as a result of placing them). The bidder status can be stored in a system database. Optionally, the resource assignment process may be adjusted in accordance with different packing schemes to increase seat utilization (e.g., to reduce or eliminate the presence of single, unallocated seats) or other efficiencies.

Optionally, the right to select resources can be grouped together for bid purposes. For example, a first auction may be held for the first 50 rights to select seats for an event, a second auction may be held for the next 200 rights to select seats for the same event, and a third auction can be held for the next 500 rights to select seats for the same event. A group can include as few as one right to select a resource, millions of rights, or other number or groupings of rights. The first, second, and third auctions, may be run concurrently, sequentially (e.g., first auction first, second auction second, third auction third; or second auction first, third auction second, first auction third, or other permutation), or in a partially overlapping manner.

Optionally, rather than assigning resources to bids based on the bid rankings or solely based on bid rankings, certain resources can be randomly assigned to a bid (e.g., to a valid bid that meets certain criteria, such that meets a certain minimum bid amount threshold, that is from a registered bidder, that is from a bidder with payment information recorded in an account record, and/or other criteria), while other resources are allocated based on the bid and resource rankings. For example, the right to be the first to select a seat (or other designated order/ranking) in a selected venue area or within the venue as a whole can be assigned randomly to a bidder even if the bidder's bid is lower than what would otherwise be needed for a resource of the randomly allocated resource ranking (or what would otherwise be the ranking).

Optionally, a resource can be separately auctioned from other resources, where the bidders do not know which resource from a set of resources they are bidding on. For example, the resource could be a right to select a seat, but the bidders do not know the ranking of the right (e.g., whether it is the first right to select, the fourth right to select, or the tenth right to select), which will be referred to as a "wildcard" right. Optionally, the wildcard right can be selected from all of the available resources (e.g., the rights to select a seat for a given event) or from a subset thereof (e.g., from the 50 first rights to select, the first top 10% of the rights to select, etc.), and the bidders can be so informed. Optionally, different wildcard rights can be auctioned for corresponding different areas within a venue or within a product range. The different auctions can have the same or different reserve prices set.

Thus, bids can be ranked based on the corresponding bid amounts and/or other criteria (e.g., the time the bids are received). The resources (e.g., the right to pick event seats) can also be ranked (e.g., first choice can be the highest ranked, second choice can be the second highest ranked and so on). After an auction for a set of resources has ended, the system can then assign resources to bidders based at least in part on the bid ranking and the resource ranking.

For example, after an auction is concluded, the highest ranked valid bid can be assigned the highest ranked right to pick a seat (e.g., the first pick), the second highest ranked valid bid can be assigned the second highest ranked right to pick a seat (e.g., the second pick), and so on until either there an no more valid bids left or no more resources remaining to be allocated. The system can then inform a bidder if the bidder was successful, and if so, which pick or right to select (e.g., first, second, third, etc.) has been allocated to the bidder.

Optionally, the system also informs the bidder of a time frame in which the user needs to make a seat selection. For example, the time frame can specify one or more days and/or a time range(s) (e.g., between the hours of 6:00 PM-8:00 PM on Apr. 28, 2007). The bidder can also be informed that if the bidder does not make a selection within the specified time frame, the bidder can make a selection at a later time (e.g., at any later time until the close of seat selections or at one or more specified later time periods), however the pool of seats may be reduced. If another bidder (e.g., a bidder which has a lower ranked right to select) is already in the process of selecting a seat at this latter time, optionally the first bidder is informed that she will have to wait to make a seat selection (e.g., wait a certain period of time and/or until a notification is provided to the first bidder indicating that a seat selection can now be made). Optionally instead, it two or more people are in the process of making a selection at the same time or within a certain period of time, the rights to select are allocated in a first come-first serve manner.

Optionally, a period of time between allocated selection times can be reserved for those winning bidders that did not make a selection during their corresponding allocated selection times. For example, a 5 minute period of time (or other period) can be reserved between allocated selection times. If a bidder failed to make a selection during the bidder's allocated selection time, the bidder can request (or can be automatically allocated) an alternate selection time. The system can then select one of the reserved periods and inform the bidder (e.g., via an email with a link to a seat selection page) regarding the new selection period time. Optionally, the bidder can request or specify (e.g., via a form) one or more preferred days and/or range of times for the alternate selection time (e.g., between 8:00 AM-8:10 AM, or earliest available time), and the system can allocate an alternate selection time (e.g., the next available alternate selection time) that meets the bidder's preferences. In certain instances, the more delayed the alternate time, the smaller and possibly the worse the available selection may be.

Optionally, the user can request that a reminder be sent by the system to the user shortly before and/or during the seat selection period. By way of example, the reminder can be sent via email, SMS message, MMS message, instant messaging service, as an entry to be added to the user's computer-based calendar, and/or otherwise provided. Optionally, the user can specify or select the form and/or timing of the reminder.

By way of illustration, an email (or other form of communication, such as an SMS message, an MMS message, an instant message, etc.) can be sent to the winning bidder providing information indicating that the bidder's bid was successful, and information regarding the seat selection right, and the selection period assigned to the bidder. The communication can include a link to a Web page. The link claim code can uniquely identify the resource selection right assigned to the bidder and/or the bidder. For example, the link can be in the form of:

http://criteriabasedallocationofresources.com/rr/select/SZ987T45, wherein SZ987T45 is a resource selection code corresponding that assigned to the bidder.

The Web page can provide information transmitted by or via the system on the seats that are available for the bidder to select. The available seats can be presented textually, via a seating chart, via a listing of the best available seats in ranked order, where the ranking is an estimate or guess by the seller, venue operator, performer or other entity as how a typical user would rank the seats. Optionally, photographs/videos of the views from corresponding seats can be accessed and presented to the bidder.

A form is provided via which the bidder can select one or more available seats (e.g., by clicking on a "select this seat" control or otherwise). The bidder (or other authorized user) can then select a seat from the available seats, and that seat is taken out of the available pool of seats for the next bidder making a seat selection. The bidder assigned the next lower ranked right to select can then similarly select a seat from the now reduced pool of seats.

Optionally, if certain bidders did not make a selection during their allocated time period or otherwise by a certain time deadline, the system can automatically allocate seats to those bidders, and the bidders can be so informed via communication to bidders before and/or after they place their bids. Optionally, a communication regarding the automatic allocation is automatically sent out by the system to those winning bidders that have not yet made a seat selection by a certain data and/or time.

For example, the system can allocate seats randomly to the bidders, or the system can use seat rankings set by the seller, and use the seller specified seating rankings and the bid ranking of the remaining bids to allocate seats to the remaining bidders (e.g., the highest ranked remaining seat is assigned to the highest ranked remaining bid, the second highest ranked remaining seat is assigned to the second highest ranked remaining bid, etc.). For example, if a bidder did not make a seat selection during the bidder's assigned time window, then at the end of the time window, substantially immediately after the close of the time window, or at another time, the system can assigned the bidder the best available seat(s) based on the seller seat ranking (or the ranking provided by another entity).

The foregoing processes has certain advantages, which need not be present, over certain other methods of allocating seats in an auction. For example, certain other techniques involve a seller guessing what resources, such as seat tickets, hotel rooms, and so on, will be considered the most valuable by potential buyers/bidders, which will be considered second most valuable, and so on in order to allocate resources to bids. However, the foregoing example embodiment avoids the problem by allocating the right to choose resources and so enables the bidder to decide which is the best available resource for the user's bid.

In certain instances it may be desirable for the resource seller and/or a resource buyer to have a resource price adjusted after an auction or set price sale has been completed. Different techniques may be used to adjust prices. A seller or other authorized entity can select the adjustment technique and the selection is stored in computer readable memory is association with the auction/sale.

In an example embodiment, in an auction, a notification is provided to a user prior to accepting the user's bid that if the user has a winning bid, the amount that the user will actually pay may be adjusted from the bid entered by the user (e.g., upwards or downwards). If there is a possibility that the price will be adjusted upwards, a check box or other user interface is optionally provided where the user needs to affirmatively indicate the user's agreement to such adjustment, should it occur.

Once an auction is closed (e.g., an auction for ranked resources), the price owed and paid by one or more winning bidders is optionally adjusted by the system, the adjusted prices are stored in system memory, a communication is sent to the winners (e.g., indicating that they have a winning bid, what resource they have been allocated, and the adjusted price), the winning bidders are charged the adjusted price, and the resources are delivered or otherwise provided to the winning bidders. For example, as discussed above, the price for which one or more winning bidders are liable for can be adjusted up or down. The adjusted price can be based on a bid amount of one or more winning bids.

For example, once the auction the auction is over, bids are ranked (e.g., from highest to lowest), bid-for ranked resources in a resource set are allocated or tentatively allocated to bids that met the reserve price (if any), until all the available resources in the set are allocated (e.g., based on the bid rankings and resource rankings) or no more bids remain. Optionally, all or a selected portion of the winning bidders are charged a price based on or equal to the lowest winning bid. Optionally, all or a selected portion of the winning bidders have the amount they owe calculated by increasing or decreasing their corresponding bid amounts by a percentage (e.g., a fixed percentage, such as 10%, or a variable percentage) or by a dollar amount. The percentage can be selected based on one or more criteria, such as number of bids received, number of resources allocated after the auction, dollar value of the resources allocated, number of resources still available, the type of resource (e.g., a seat at a particular venue, a ticket to see a particular act or sporting event), etc.

Optionally, a limit can be set by the seller or auction operator as to how large an upward adjustment can be and/or how large a downward adjustment can be. The maximum adjustment can be specified as a percentage of the bid and/or as a fixed dollar amount. Optionally, a bidder can specify the maximum amount (in dollars and/or as a percent of the bid) of upward adjustment acceptable to the bidder. If the system determines that the upward price adjustment exceeds that specified by the bidder, the bidder's bid can be removed from those receiving resource allocations.

Optionally, all or a selected portion of the winning bidders are charged a price based on a central tendency, such as the:

average;

median;

mode (the most frequent bid amount in the set of winning bids);

geometric mean (the nth root of the product of n data values);

harmonic mean (the reciprocal of the arithmetic mean of the reciprocals of the data values);

quadratic mean or root mean square (RMS) (the square root of the arithmetic mean of the squares of the data values);

generalized mean (the nth root of the arithmetic mean of the nth powers of the bid amounts);

weighted mean (an arithmetic mean that incorporates weighting to certain data elements);

truncated mean (the arithmetic mean of data values after a selected number or proportion of the highest and lowest bid amount data values have been discarded);

midrange (the arithmetic mean of the highest and lowest values of the bid amounts or distribution);

Winsorized mean (the arithmetic mean of bid amount values after a selected number or proportion of the highest and lowest bid amount data values have been set equal to the largest and smallest bid amount values that remain);

exponential mean;

trimean (calculated by adding twice the sum of the mean to the sum of the 25th percentile and 75th percentile and then divide the sum by four);

trimedian (calculated by adding twice the sum of the median to the sum of the 25th percentile and 75th percentile and then divide the sum by four); or normalized mean;

of some or all of the winning bids.

By way of example, the following formula can optionally be used more generally to determine the price to be paid by some or all of the winning bidders:

$$y = f^{-1}\left(\frac{f(x_1) + f(x_2) + \ldots + f(x_n)}{n}\right)$$

where:

y=the price to be paid;

x=the value of a winning bid;

f is an invertible function (has an inverse) (e.g., $f(x)=1/x$; $f(x)=\log x$; $f(x)=e^x$, etc.);

n=the number of winning bids being used to calculate y.

As discussed above, optionally only a portion of the bids have a price adjustment. For example, optionally winning bids above the selected central tendency are lowered to be equal to or otherwise based at least in part on the selected central tendency, and those winning bids that are equal to or less than the selected central tendency are unchanged. Optionally winning bids below the selected central tendency are raised to be equal to or otherwise based at least in part on the selected central tendency, and those winning bids that are equal to or greater than the selected central tendency are unchanged. Optionally, the winning bids above the selected central tendency are lowered to the selected central tendency, and those bids that are less than the selected central tendency are raised to the selected central tendency, and the winning bids that are equal to the selected central tendency are unchanged.

Optionally, bidders can be provided the ability to opt in to, or opt out of the possibility of a price adjustment when submitting their bids. In this example embodiment, if a bidder does not opt-in, if the bidder has a winning bid, the bidder will pay the winning bid amount, rather than an adjusted price (which can be adjusted up or down). If a bidder opts-in, and if the bidder has a winning bid, the bidder will pay the adjusted price. Thus, if the bidder believes that his or her bid is likely to be on the high side of the winning bids, the user may elect to opt-in to bid adjustments. If the bidder believes that his or her bid is likely to be on the low side of the winning bids, the user may elect not to opt-in (or to affirmatively opt-in) with respect to bid adjustments. This process may encourage bidders to bid on the higher side. Optionally, a bidder can be required to opt-in in order to participate in an auction.

Optionally, at the end of an auction, after price adjustments are made, if a price is adjusted upwards for a bidder, the bidder is informed via a communication of the final, adjusted price, and offered the opportunity of abandoning the allocate resource (e.g., the right to select a ticket). If the bidder indicates (e.g., by clicking on a link in the communication, by sending an email, or otherwise) that the bidder is abandoning the resource, the resource is allocated to the next highest bidder, and optionally, the resource allocation is redone for low ranked bids.

Optionally, only bidders having a certain characteristics (e.g., members of a preferred members group, members of a fan club, those who have purchased a certain amount or value of resources in a given time frame, those who have purchased resources with a certain frequency, etc.) are provided with a downward adjustment.

As similarly discussed above, optionally, a limit is set and stored in system memory as to how much a price can be varied from the bid. For example, a bid price may be adjusted upwards to the selected central tendency or 20% (or other specified percentage) whichever is less.

While the above examples of price adjustments refer to price adjustments of auctioned resources, optionally resources sold at a fixed price (e.g., where the seller offers a resource at a stated price, and the item is sold to a user that pays the price) can also have a price adjustment as similarly discussed above with respect to auctions. For example, the price adjustment can be based on one or more of the number of resources sold (e.g., the number of tickets sold for an event, the number of tickets sold for a designated event seating area, etc.), the percentages of resources sold, the dollar value of the resources sold, number of resources still available, the type of resource (e.g., a seat at a particular venue, a ticket to see a particular act or sporting event), etc.

As similarly discussed with respect to auctions, optionally, a limit can be set by the seller or system operator as to how large an upward adjustment can be and/or how large a downward adjustment can be. The maximum adjustment can be specified as a percentage of the original stated price and/or as a fixed dollar amount. Optionally, a prospective purchase can specify the maximum amount (in dollars and/or as a percent of the bid) of upward adjustment acceptable to the bidder. If the system determines that the upward price adjustment exceeds that specified by the prospective purchaser, the prospective purchaser's offer to buy can be removed from those receiving resource allocations.

For example, if an event is sold out, the price may be adjusted upwards for those who purchased a ticket (e.g., by 10% or other amount) as the sold-out condition indicates that the ticket may have been under-priced. If only 60% of the seats are sold, the price may be reduced (e.g., by 15% or other amount) for those the purchased tickets as the low rate of sales indicates that the tickets may have been over priced. The amount of the reduction can optionally vary in accordance with the percentage of seats sold.

Optionally, when a user purchases a resource, such as a ticket or a right to choose a ticket, in an auction or in a standard sale at a fixed price, the user is substantially immediately offered the opportunity to repost the item for sale (e.g., during the same Web session, within 30 seconds after the purchase, or other short time frame). Thus, a user can purchase a ticket in the primary market, from the original seller, and immediately post it for resale (e.g., for money or in exchange for other similar or different resources) in the secondary market (e.g., if the user believes the ticket is worth more than the user paid for the ticket). Purchasers in the secondary market can be assured of the validity of the reposted resource by the resource issuer and/or system operator.

By way of illustration, during a ticket purchase process (e.g., in the primary market or in the secondary market) conducted via a ticketing website, a user can be asked to indicate if the user wants to resell the ticket/rights to use seats at issue. The resale request can be made during the same Web session as the purchase. An HTTP exchange between the browser and the remote system may include an HTTP cookie which identifies state, such as a unique session ID, user preference information and/or authorization level. Thus, optionally, the system can track a user through a web site by assigning a unique session ID which is transmitted back to the system by the user terminal with each request. The session ID can be used to authenticate the user. For example, the session ID is optionally used to uniquely identify a user browser. System server-side processes are optionally used to associate the session ID with an allowed level of access. Session identifiers are particularly useful when stateless protocols such as HTTP are being used.

By way of illustration, the user can be asked via a Web form or other user interface if the user wants to resell the ticket during a seat selection process, during a payment process, after the user has submitted or authorized payment, or after the payment has been verified. The user can indicate that the user does want to sell some or all of the tickets/rights to use seats purchased or being purchased by the user by clicking on a resell link, check box, or other control. In an example embodiment, the can specify via a user account management interface that as a default (which can be overridden), tickets purchased by the user are to automatically be posted for resale, or are not to be automatically be posted for resale.

If the user indicates that a ticket is to be resold, the indication is stored in memory, and a form is presented via which the user can specify which tickets are to be resold. Optionally, if the user only has one ticket, the ticket is automatically posted without the user having to manually select the ticket.

In addition, the form also includes a price field via which the user can specify the resale price for each ticket or set of tickets.

The system optionally includes a legal engine to determine whether a posting/resale of a resource (e.g., a ticket or a right to select or purchase a ticket) is in compliance with state or local regulations of the reseller, the buyer, venue, and/or where the system or system operator are located. The legal engine can also verify whether the posting/resale is in compliance with the venue, act, sports team, promoter, and/or other entity with a right to specify resale criteria. For example, the user can be asked to supply information regarding his or her residence, such as the city, state, and/or zip code of residence. Similarly, the buyer can be asked to supply information regarding his or her residence, such as the city, state, and/or zip code of the residence.

When a buyer attempts to post a ticket for resale, or when a secondary market purchaser makes a purchase request, the system's legal engine can then access one or more database records corresponding to that state and/or locality of original buyer/reseller, secondary market purchaser, and/or venue, and/or sales criteria specified by an issuer (e.g., the venue operator, the act/sports team corresponding to the ticketed event, the event promoter, and/or other entity with a right to specify resale criteria, also referred to as an issuer). The one or more database records can include an indication as to whether the resell of tickets is permitted by individuals and/or other entity-type in the state or locality, whether a reseller of a ticket has to wait a specified period of time before posting a ticket for resale, (e.g., 5 days, 10 days, or other amount of time to discourage resource speculation), whether the particular buyer/reseller is barred from making such sales, whether there is a limit on the amount (e.g., a dollar limit or percentage) over ticket face value that can be charged and/or whether there is a limit on the number of tickets an individual, or other specified entity, can sell within a specified period or for a given event.

If a particular resale is prohibited under the regulations of the residence of the original buyer/reseller and/or venue or by the issuer, then the system notifies the prospective reseller that the posting of the ticket for sale will not be accepted. If the resale is prohibited because the original buyer/reseller was asking too high a price, the original buyer/reseller is notified by the system of the prohibition reason, and is informed of the maximum price or premium that the seller can charge for the ticket. Similarly, if the sale is prohibited because the original buyer/reseller was selling too great a quantity of tickets, the original buyer/reseller is notified by the system of the prohibition reason, and is informed of the maximum number of tickets the original buyer/reseller can sell or post at this time. If the sale is prohibited because the original buyer/reseller has not waited a mandatory amount of time after purchasing the ticket, the original buyer/reseller can be so informed, and can be informed when the original buyer/reseller can post the ticket or other resource for sale. If the sale of a ticket is prohibited based on the location of a prospective secondary market purchaser, then in response to the prospective purchaser making a purchase request, the prospective purchaser can be notified that the purchase request will not be accepted. Users can be notified of resale restrictions prior to completing the purchase of a resource. Optionally, users may be required to formally agree to such restrictions (e.g., by clicking on an "I accept" control or otherwise) prior to completion of a resource purchase.

Optionally, when a resource is sold or otherwise transferred, a fee is charged (e.g., on behalf of an intermediary running the resource allocation system, the issuer, and/or other qualified entity). Optionally, the legal engine ensures that the fee does not violate statues, regulations, or other rules of a governmental entity or an issuer. For example, a state or an issuer may place a cap on the amount of the fee (e.g., expressed as a dollar amount and/or as a percentage of the original ticket face value or the resale price) and/or the sum of the fee and the resale price as compared to the face value/original sales price, and the legal engine will limit a fee to the capped amount.

Optionally, only registered users of the resource allocation system and/or users that have an enhanced membership (e.g., by paying a yearly fee), are allowed to resell resources. Optionally, only registered users of the resource allocation system and/or users that have an enhanced membership (e.g., by paying a yearly fee), are allowed to purchase resources being resold.

In certain circumstances, a resource may be easily copied, and such copying may have adverse consequences. Therefore, optionally, if a user resells certain types of resources, such as a ticket or a reservation, the original resource issued to the user is cancelled or otherwise invalidated, and a comparable resource is issued to the purchaser of the resold resource, with a feature that distinguished the comparable resource from the original resource sold to the user. For example, if the resource is a ticket, if a new buyer purchases a ticket being resold by a reseller/original buyer, then the system cancels the reseller's tickets and issues a new ticket (e.g., electronic or physical) to the new buyer. In addition, the system, system operator, or other authorized entity can accept the cancelled resources from the seller to take the original resources out of circulation.

Optionally, other ticket brokers, and/or other specified entities, can be selectively prohibited or prevented from using some or all of the site functionality. For example, other ticket brokers can be prevented from buying and/or posting tickets using the system.

Different delivery methods can be used depending on the resources being delivered. Certain resources, such as rights to use a seat (e.g., a ticket) can be physically or electronically delivered. By way of example, electronic delivery can send or deliver a ticket, or a manifestation of a ticket (which, will also be referred to as a "ticket"), (a) inside an email, (b) as an attachment to an email, (c) as a download from a web site, (d) as an association with an item of the recipient (e.g., a driver license, a credit card, a membership card, etc.), (d) to a telephonic device (e.g., a mobile telephone) which is configured to display a corresponding visual code (e.g., a barcode) via a display and/or which can wirelessly transmit a corresponding electronic code to a receiver, or (e) otherwise. Optionally, the user can print an electronic ticket for use at a venue (e.g., including a barcode or other validation code), or the corresponding information can be transmitted to the venue's ticketing apparatus so that an operator can retrieve the ticket information. The system can track when the delivery is sent, received or accepted and store such information in the system database. Optionally or in addition, the ticket can be mailed as a physical ticket via the postal service, courier service, or otherwise.

Example allocation systems, processes, and user interfaces will now be described with reference to the figures. Throughout the following description, reference will be made to various implementation-specific details, including, for example, process flows, protocol standards, and forms used for requesting and offering resources. These details are provided in order to set forth preferred embodiments of the invention, and not to limit the scope of the invention.

Figure 1B:
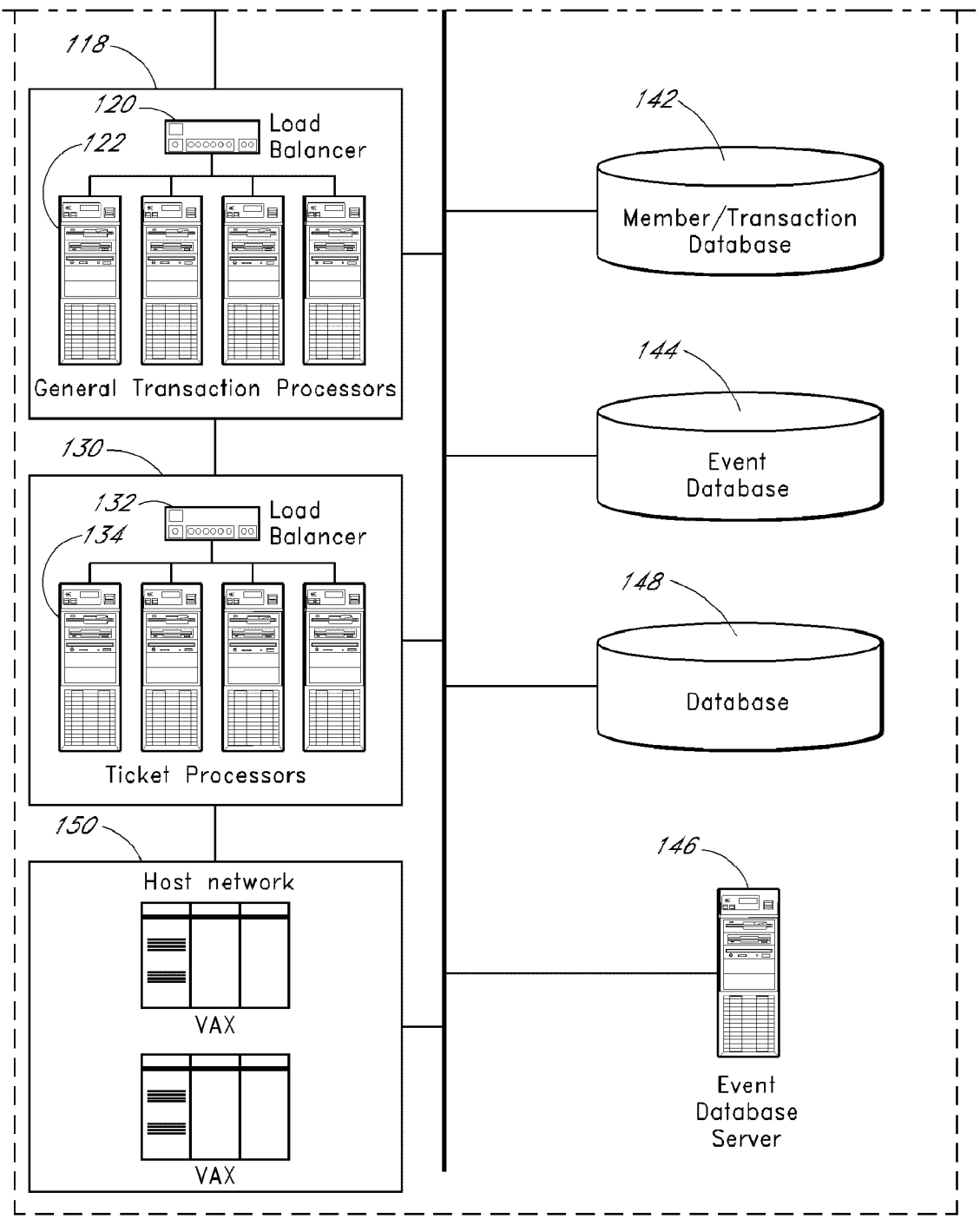

FIGS. 1A-B illustrates an example system embodiment that can be used in conjunction with the pricing and/or resource allocation processes described herein. Not all of the illustrated systems and components need to be included in the system and other systems and architectures can be used as well. With reference to FIGS. 1A-B, a user terminal 102 is coupled to an example resource allocation and distribution system (e.g., a ticketing system) 104 over the Internet 105 using a protocol, such as HTTP/HTTPS. By way of example, a user terminal can be in the form a of personal computer, a personal digital assistant, a smart phone having an operating system, a mobile or stationary phone, a networked television, a networked media server, etc. An example web proxy system 106 includes an optional load balancer 108 and web proxy processors 110, and can selectively block or route an inbound request from a user browser executing on the terminal 102 to an appropriate internal destination, which can be a queue or other destination server.

The illustrated example system 104 includes an example Web application system 112, which includes an optional load balancer 114 and Web application processors 116. A general transaction system 118 includes an optional load balancer 120 and transaction processors 122 that are used to generate transactional pages (such as some or all of the user interfaces described herein), populate data caches, provide logic and/or rules for the transaction flows, provide users with queue related messaging based on the queue position of a resource request, and to sequence requests. A cache cluster system 124 includes an optional load balancer 126 and processors 128. The cache cluster system 124 caches data and states for quick access by other system components.

An example processor system 130 is provided that includes an optional load balancer 132 and resource sales processors 134. Optionally, the processors 134 can be used for a variety of types of sales and/or allocations, including, by way of illustration and not limitation, auctions, fixed/static price resource sales, and/or dynamic pricing of resources. The example processors 134 conduct and/or manage the sales, keep track of resources or sets of resources being sold or otherwise allocated, the ownership history of resources (e.g., identification of the current holder and past holders), the status of sales, and in the case of auctions, the type of auction, the identity of current bidders, the current bid amounts, the minimum bid increments, the reserves, the current lowest bid prices needed to potentially win auctions, the number of resources in a set being auctioned off, and so on.

The use of load balancers and multiple ticket sales processors can enable the sale/auction to continue, potentially with little or no performance impact, even if a system component (e.g., a processor 134) fails. For example, if a sales processor fails, processes that were performed by the failed processor are optionally directed via the load balancer to another sales processor. A session cluster system 136 includes an optional load balancer 138 and a plurality of processors 140 and is used to manage sessions.

A member transaction repository database 142 stores user contact information, billing information, preferences, account status, and the like, that can be accessed by other portions of the system 104. In addition, the database 142 can store an opt-in indication, wherein, with respect to auctions, the user has agreed to have their bid automatically increased by a certain amount and/or up to a maximum amount in order to attempt to ensure that they win a given auction. Optionally in addition or instead, the database 142 can store an opt-out indication. The database 142 can also store a user opt-in/opt-out for notifications regarding auctions, auction status, and/or change in the user's bid status from losing to winning bid or from winning to losing.

The database 142 can also store a user opt-in/opt-out for notifications regarding non-auctions, such as for notifications when prices have been decreased in a price decay sale, or when prices have been increased, etc. Optionally, the database 142 stores a user indication that a user will purchase a resource (e.g., a ticket or right to select a seat for a given event for a given seating area (or areas)) if the ticket price is at or below a specified amount, wherein if the ticket price meets the user price criteria, the system automatically completes the purchase and charges the user. By way of example, the user can specify such purchase criteria via a web page hosted by the system 104.

Optionally, the database can store a user opt-in/opt-out for notifications regarding the release of additional resources (e.g., seat tickets for an event with a certain performer) of a type identified by user. For example, a notification can be transmitted to the user each time seat tickets are provided for sale or auction for a given event. Optionally, the opt-in can be limited to notifications for the release of seat tickets in selected venue areas or ticket price bands.

An event database 144 stores information regarding events, including, by way of example, the venue, artist/team, date, time, and the like. The event database 144, or a separate database, includes ticket information records, including one or more of barcode information, event name, event date, seat identifier, ticket holder name or other identifier of a current ticket holder, names or other identifiers of past holders of the ticket, a ticket valid/invalid indicator, and/or an indicator that as to whether the ticket has been used. An event database server 146 is used to provide event database access to other portions of the system.

An example database 148 is provided that stores one or more seller resource sales rules. For example, with respect to auctions, the sales rules can include auction rules (e.g., criteria for what a winning bid actually pays, what formula(s) are to be used in determining what a winning bid is to pay, when the auction will start, when the auction will end, etc.), auction operator rules, bidder eligibility criteria, information on the resources being auctioned, including a description, the reserve price (if any) the minimum bid price (if any), the minimum bid increment (if any), the maximum bid increment (if any), the quantity available, the maximum and/or minimum quantity of resources a given user can bid on (if any), the date the auction ends for the corresponding resources. The database can store the current bids, the current bid ranking, corresponding bidder identifiers, bid ranking criteria, resources categories, and/or the like.

By way of example, optionally the system may condition a user's eligibility to purchase or bid for resources, or specific resource group based on certain user or other characteristics, which may include, without limitation, whether the user has purchased or registered for a certain type of membership, the user's past purchase history with respect other items sold or offered for sale by the seller or a third party, where the user lives (for example, bidders may be required to be within a particular geographic region, within a particular governmental entity, such as a particular state or states, city or cities, zip code or zip codes, or within a certain distance from a given location, such as a venue or the like), and/or whether the user meets certain financial qualifications.

The database 148, or another database, can also store information regarding non-auction resource sales (e.g., ticket sales for an event), such as a presale beginning date, where selected users (e.g., members of one or more specified fan clubs, season ticket holders, holders of certain types of financial instruments, such as a credit card associated with a specified brand or issuer, frequent ticket buyers, etc.) can purchase resources at set prices before the general public can, a presale end date, an on sale beginning date, where the general public can purchase resources at set prices, an on sale end date, the maximum quantity of resources a user can purchase, and so on. With respect to a non-auction sale where the price of certain resources are adjusted during a sales period (e.g., wherein a ticket price is increased or decreased over the course of a ticket sales period to enhance total revenues), the database 148 can further store some or all of the following: information regarding a minimum resource sales price, a maximum resource sales price, a minimum dollar increment with respect to increasing a resource sales price, a minimum dollar decrement with respect to decreasing a resource sales price, a maximum dollar increment with respect to increasing a resource sales price, a maximum dollar decrement with respect to decreasing a resource sales price, the data and/or time when price increments or decrements are to take place, and a limit on the number of resource price changes within a specified period (e.g., no more than one price change every four hours, no more than one price change every twenty four hours, etc.).

A survey and historical information database 149 can also be provided that stores survey results from consumers related to, by way of example, resource pricing and ranking (e.g., ticket pricing and/or seat, area, or section ranking). In addition, the database 149 optionally includes historical sales information (e.g., rate of resource sales, such as the ticket sales per section or area for one or more historical events, total ticket sales per section for one or more historical events, rate of ticket sales per price band for one or more historical events, total ticket sales per price band for one or more historical events, etc.). The database 149 can also include actual/estimated cost and revenue data.

A host network system 150 is provided that stores bids (e.g., winning and optionally losing bids), event, sales, and auction set-up information, section and seat information (e.g., quality or ranking information), seat to bidder allocations in the case of auctions, and credit card processing.

Figure 2:
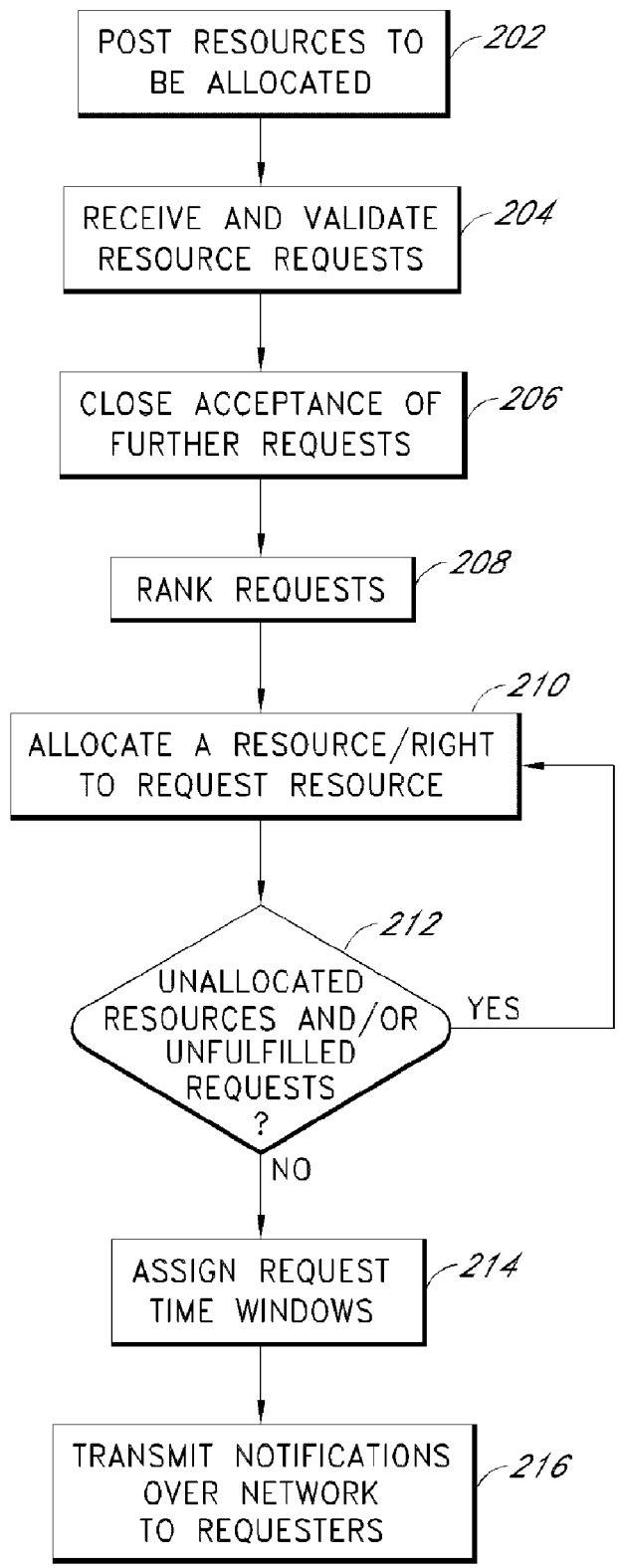
FIG. 2 illustrates a first example process.

FIG. 2 illustrates an example process for auctioning of a right to select a resource. At state 202, a set of resources are posted for auction on a website. In this example, the resources are the right to select seats for an event. Optionally, several sets can be put up for auction. For example, the first 100 rights can be auctioned off in a first auction with a first reserve price. The rights to select can be ranked, wherein the first right to select has a rank of one, the next right to select has a rank of 2, and so on. The next 500 rights can be auctioned off in a second auction with a second reserve price, which optionally is lower than the first reserve price, and so on. The rankings are stored in system memory.

At state 204, requests for the posted resources are received (e.g., in the form of bids) and inspected by the system to determine if they comply with auction rules (e.g., met the reserve, if any, met any quantity limitations, do not originate from an undesirable source, etc.). At state 206, the auction closes. At state 208, the bids that have not been rejected are ranked. At state 210, a right to select is allocated to a bid in accordance with the respective rankings. At state 212, a determination is made as to whether there are remaining bids that have not been allocated resources, and whether there are remaining unallocated resources. If there are remaining bids that have not been allocated resources, and there are remaining unallocated resources, the process proceeds back to state 210 and the next ranked resource is allocated to the next ranked bid. Otherwise the process proceeds to state 214.

At state 214, selection time windows are allocated to the bids. The first time window is assigned to the highest ranked bid, the second time window is assigned to the second highest ranked bid, and so on. At state 216 notifications are sent out to the winning bidders. The notification can include the ranking of the selection right the bidder has been allocated, a time period in which the bidder is to make the selection, and a control (e.g., a link to a Uniform Resource Locator (URL)) which when activated, causes a seat selection Web page (or other user interface for seat selection) to be presented in a browser when activated in the designated time window.

Optionally, a calendar entry can be sent to some or all of the winning bidders which will be added to the winning bidders' calendars (e.g., for those bidders that affirmatively agree to have the calendar entry added to the calendar). The corresponding calendar application then generates an alarm or other notice slightly before and/or at the beginning of the selection window.

Figure 3:
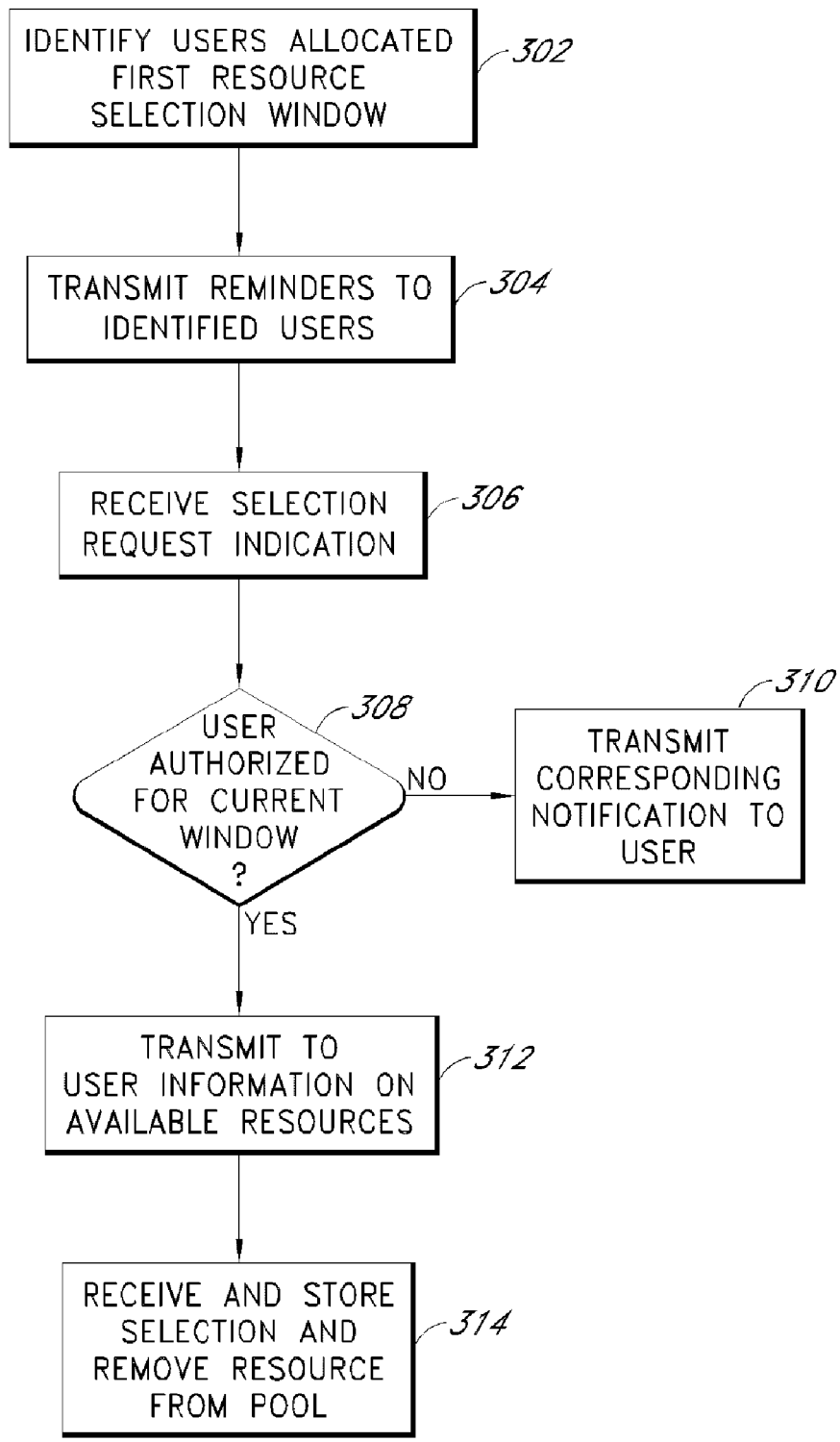
FIG. 3 illustrates a second example process.

FIG. 3 illustrates an example resource selection process. While the following example refers to a bidder, optionally another user designated by the bidder is considered the bidder. At state 302, the system identifies which bidders have been allocated resource selection windows that will fall within a first period of time (e.g., where the first period of time starts 12 hours from the current time and ends 24 hours from the current time). At state 304, the identified bidders are sent out reminders regarding their upcoming seat selection windows.

At state 306, an indication is received at the system that a bidder wants to select a resource (e.g., from a bidder computer, over the Internet, via a link activation by a bidder, wherein a resource selection code is received as part of an HTTP message). At state 308, the resource allocation system uses the resource selection code to access a database record associated with the code, and determines from the database record whether the bidder is authorized to select a resource at the current time. Optionally, rather than accessing a database record, the code can include a window selection period identifier in an encrypted form.

If the bidder is not entitled to select a resource at the current time, the process proceeds to state 310 and a notification is provided to the bidder (e.g., via a Web page presented in a browser) over the network to the bidder terminal. If the bidder activated the link prior to the window assigned to the bidder, the notification can so inform the bidder, and can further notify the bidder of the start and end periods of the window allocated to the bidder.

If the bidder activated the link after the window assigned to the bidder has passed, the bidder can be so informed, and an alternate window is selected by the system and assigned to the bidder. Optionally, the bidder provides alternate window preferences which the system uses to select one or more potential windows for the bidder. The system can present a plurality of window options from which the bidder can select. The bidder's selection is received and stored in a system database.

If the bidder activated the link after the bidder has already made a selection, the bidder is so informed.

If at state 308, the resource allocation system determines that the bidder is authorized to select a resource at the current time, the process proceeds to state 312. At state 312, the system retrieves from the system database the currently available resources that the bidder is entitled to select from. The system then displays information regarding the available resources to the bidder from which the bidder may select. For example, if the resources being selected are venue seats at an event, the listing of the available seats is presented in a list format and/or via a seat chart with available seats highlighted (e.g., via color coding, an icon, an alphanumeric code). If the resources are computer system resources, a listing of available times can be presented.

At state 314, the bidder's selection is received and stored in the system database. The selected resource is removed from the pool of available resources. At state 314, a notification and a voucher (e.g., a ticket) are sent to the bidder for the resource.

FIG. 4A illustrates an example user interface configured to receive bids. The user interface can be accessed from a ticketing web site via a web browser. The user interface illustrated in FIG. 4A, provides fields via which the user can specify for which right-to-select groups a user bid is to be considered in an event ticket auction. In this example, the first listed group is considered the most desirable listed rights-to-select, the second listed group is the second most desirable listed rights-to-select, etc. In this example, the right to select is the right to select a pair of adjacent event seats.

The user can use a group selection menu to indicate the lowest ranked seat selection group the user is willing to accept. If the user's bid is not sufficient to meet the minimum bid in the best group, the bid will automatically be submitted in the next best group. If the user's bid is not sufficient to meet the minimum bid in the next best group, the bid will automatically be submitted in the third best group, and so on until either the user's bid is not sufficient to meet the current minimum bid in the seat selection group that the user indicated was the lowest ranked acceptable seat selection group, and the bid is given a status of "losing bid", or the user's bid is sufficient to win a seat selection right in a group. Optionally, the menu provides a "select all" option control if the user wants the bid compete in all listed groups. If the user selects all, the user's bid will remain active in the group with the most desirable listed rights-to-select for which the bid is equal to or greater than the current minimum acceptable bid.

In this example, the user can instead manually select one or more of the listed groups. In the illustrated example, the user has selected the groups 1-4, which include the first 2000 rights-to-select. In addition, the user interface provides the current minimum bid for the corresponding group. The user interface explains that in the example auction, the more groups selected by the user the better the chances the user will win a right to select, thus encouraging the user select several groups. The user interface also lists the performer name ("Bon Jovi"), the tour name ("Have a Nice Day"), the venue ("Don Haskins Center, El Paso, Tex."), and the date and time of the event. The user interface also lists the auction start date/time, end date/time, and time remaining in the auction. An opt-in field is provided via which the user can request that a notification (e.g., an email notification) be provided to the user if the user's bid status changes (e.g., from winning to losing). The user can activate a "Submit" control to submit the bid.

The example user interface illustrated in FIG. 4B lists the right-to-select groups previously selected by the user and the current minimum bid. A control (e.g., an "Add More Groups" link) is provided via which the user can add additional right-to-select groups (e.g., using a user interface similar to that illustrated in FIG. 4A). For example, if the user activates the control, a "Bid Per Group" field is provided via which the user can enter the amount the user is bidding for each right-to-select requested by the user via a "Quantity" field. The user is informed regarding any bid increase limitation (e.g., bid increases are restricted to multiples of $5).

Optionally, a bid status user interface can be provided. In an example embodiment, the user interface displays the user's current bid per right-to-select, the right-to-select quantity designated by the user, and the total bid amount (e.g., the ticket quantity multiplied by the user's current bid per right-to-select), optionally, excluding service fees. The user interface optionally displays the bid status (e.g., outbid, winning, etc.) for each of the right-to-select groups selected by the user. By way of example, the interface can inform the user that the user has bid $100 per right-to-select for a right-to-select quantity of four.

The user has been outbid for the Right-to-Select Group 1, where the current minimum bid is $110, and is winning in Right-to-Select Group 2 (fourth row ticket group), where the current minimum bid is $80.

A control (e.g., an "Add More Groups" link) is optionally provided via which the user can add additional right-to-select groups (e.g., using a user interface similar to that illustrated in FIG. 4A or 4B).

The user can be informed that the user needs to increase the user's bid to win a right-to-select right in Group 1. A field ("Increase Bid Per right-to-select to") is optionally provided via which the user can specify a new bid. The user can click on a "Calculate" control and a new total bid amount will be calculated by the ticket system or on code executing on the user's computer, and new total bid amount will be displayed to the user. The user can then activate a "Submit" control to submit the new bid. Once the auction is concluded, the user will be awarded tickets from the most preferred ticket group (e.g., highest rank ticket group) for which the user's bid was a winning bid (if any).

Figure 5:
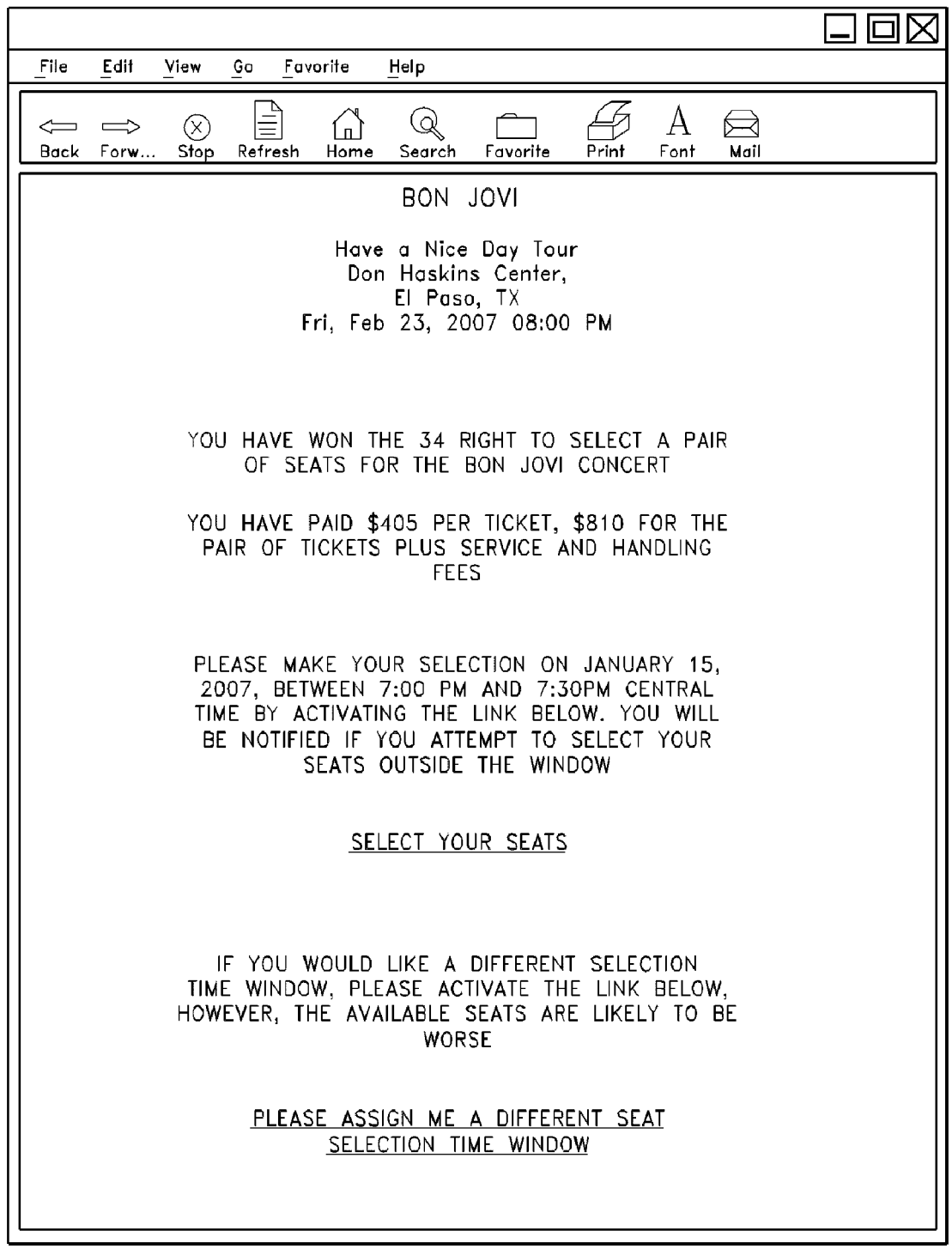

FIG. 5 illustrates an example communication including a link to a resource selection user interface in the form of a Web page. As illustrated, the communication lists the date and time range in which the user is to make a seat selection for an event, a selection rank, and an event name, venue, date, and time. In addition, the communication lists the price paid by the user for the resource. A link is also provided, which when activated causes a user interface to be presented via which the user can request an alternate selection period. A reminder communication can be sent at a later time that includes some or all of the information included in the example communication illustrated in FIG. 5.

Figure 6:
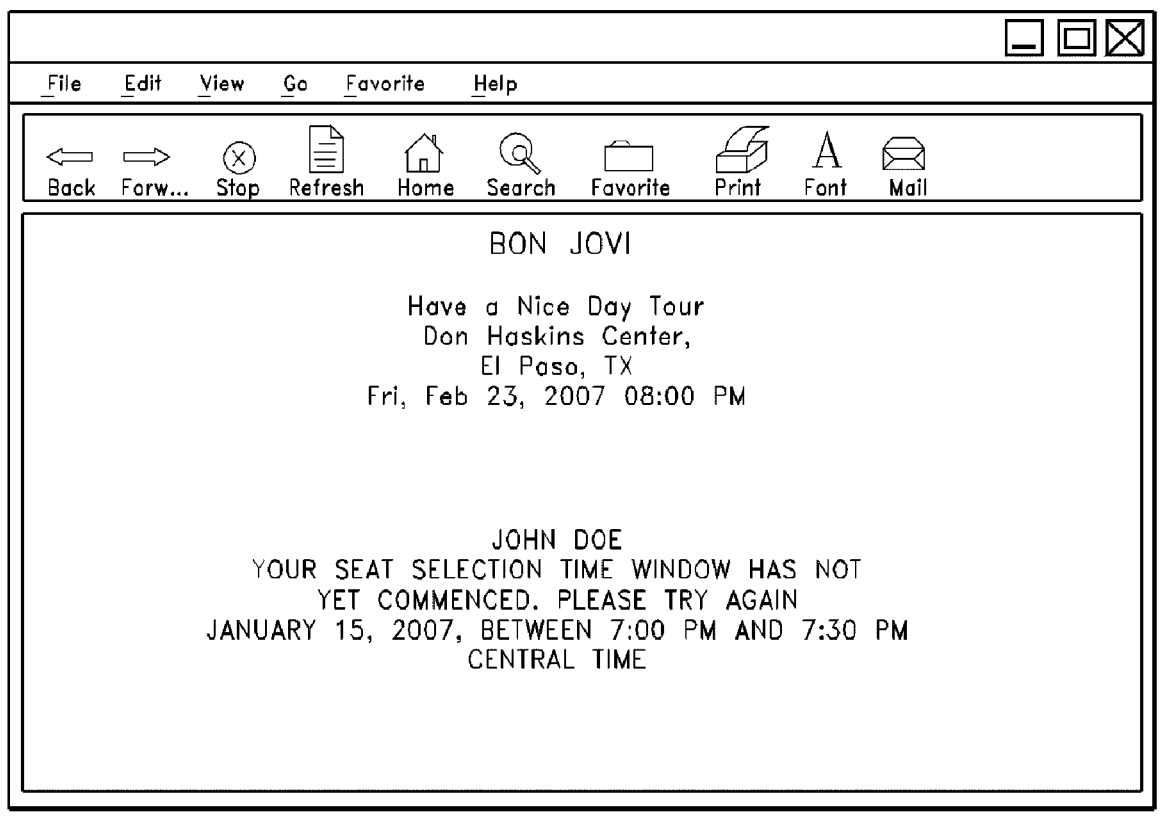

FIG. 6 illustrates an example user interface presented when the user activates the link illustrated in FIG. 5 prior to the specified time period. The system determines from the link or via data, accessed from memory, corresponding to the link that the current time falls before the time window for which the link is authorized. The user interface includes a notice generated by the system informing the user that the time window has not started yet and indicating the date and time window in which the user is entitled to make a resource selection.

Figure 7:
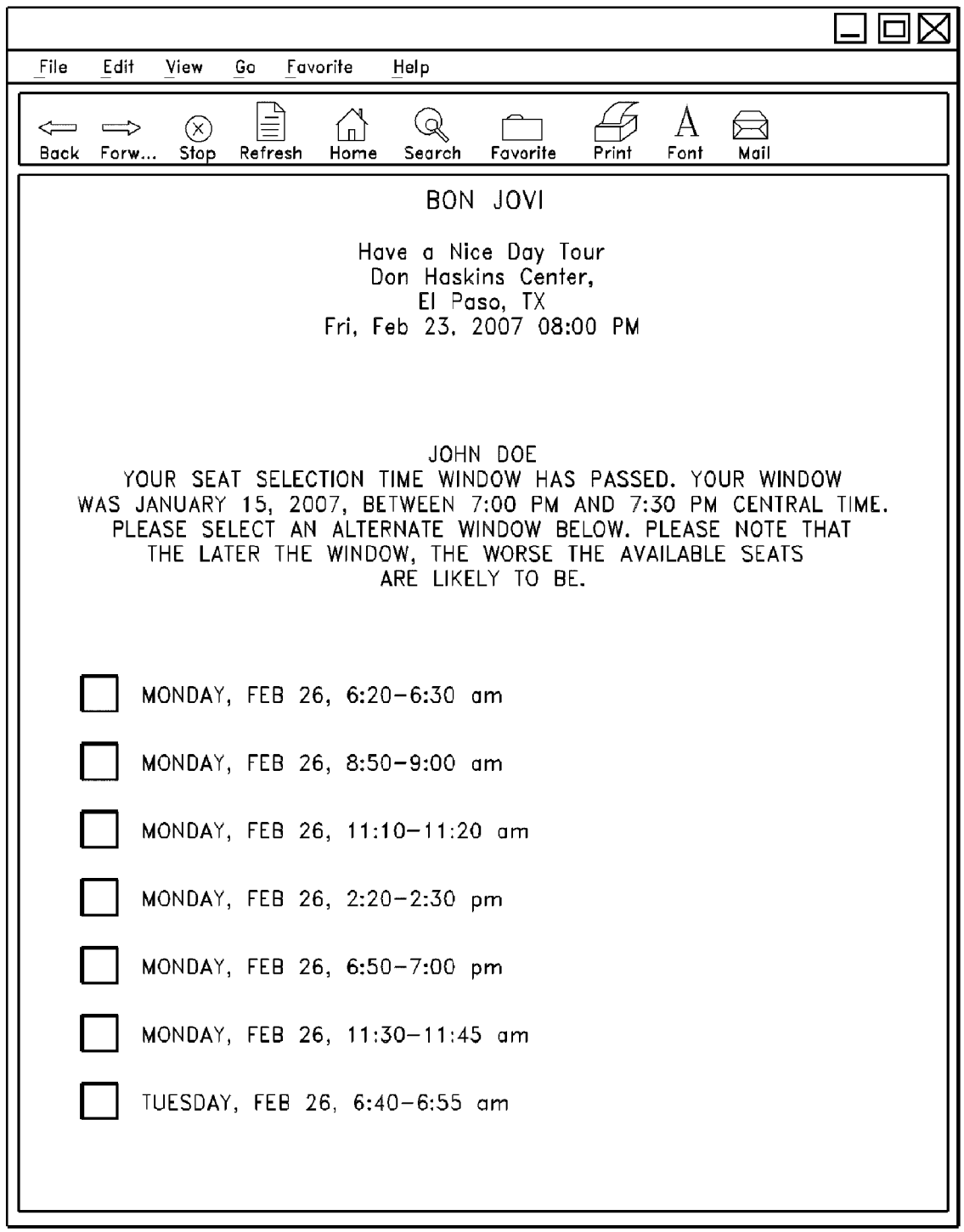

FIG. 7 illustrates an example user presented when the user activates the link illustrated in FIG. 5 after the specified time period. The system determines from the link or via data, accessed from memory, corresponding to the link that the current time falls after the time window for which the link is authorized. The user interface includes a notice generated by the system informing the user that the time window for which the user was authorized to make a resource selection has passed, and includes the date and time window in which the user was entitled to make a resource selection. The example user interface includes a form for selecting an alternate resource selection window. The user interface includes fields via which the recipient can indicate a desired time. The user can select "soonest available time", or from several blocks of time (e.g., 6:20 AM-6:30 AM, 8:50 AM-9:00 AM, 11:10-11:20, 2:20 PM-2:30 PM, 6:50 PM-7:00 PM, 11:30 PM-11:45 PM).

Figure 8:
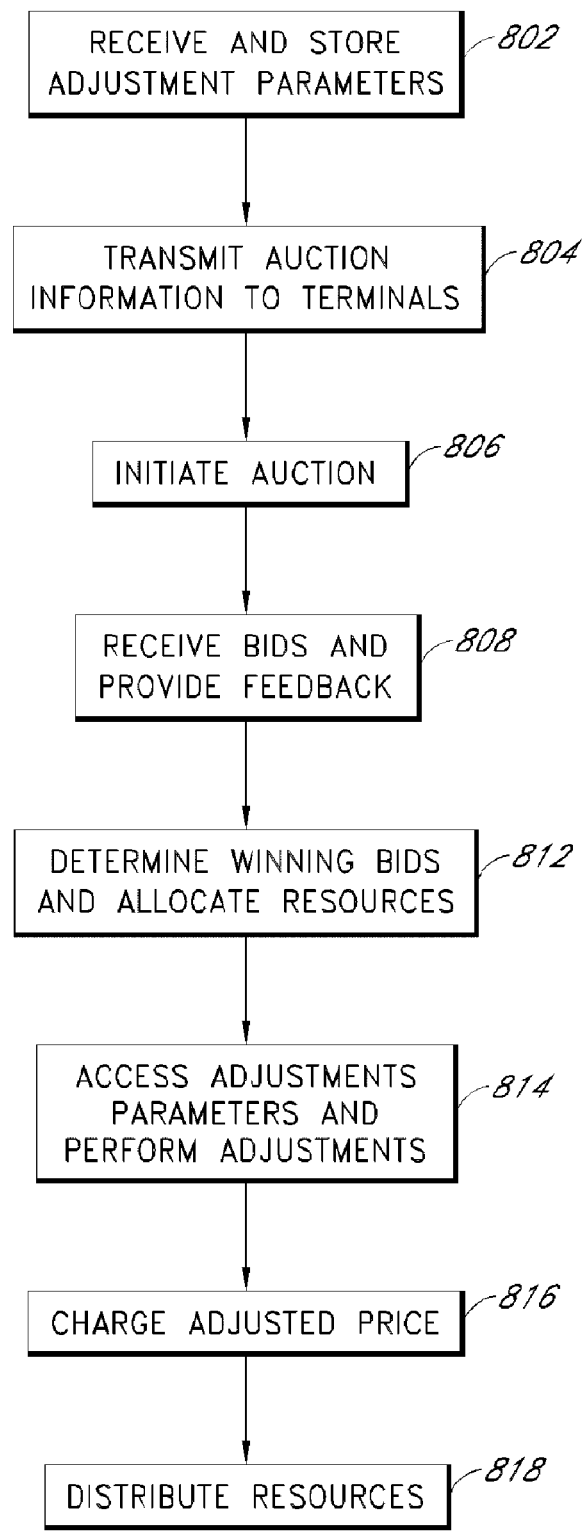
FIG. 8 illustrates a third example process.

FIG. 8 illustrates an example process wherein price adjustments are made after the close of an auction. At state 802, a seller or other authorized entity selects the adjustment parameters (e.g., the maximum permitted adjustment specified as a dollar amount and/or a percentage, whether the price can be adjusted upwards, whether the price can be adjusted downwards, which set of bids are to have a price adjustment, what formula is to be used in calculating a price adjustment, etc.). For example, the selection can be made via a form (e.g., an electronic form or a paper form). If the form is an electronic form, it can be transmitted from the resource allocation system over a network (e.g., the Internet) to a seller terminal (e.g., as a Web page).

The seller makes/enters selections via fields corresponding to the adjustment parameters which are transmitted back over the network to the resource allocation system and stored in memory in association with the resources being allocated. The seller can also set, via appropriate fields, some or all of the following: reserve prices (if any), minimum bid increments, whether proxy bidding is to be enabled, if resources are to be sold in groups (e.g., groups of two), what time the auction is to start and end, what resources are to be auction off, whether a bidder can abandon a purchase of a resource if the price is adjusted, or if the price is adjusted more than a certain amount or percentage, etc.

At state 804, the system posts and/or transmits notifications regarding the auction, including some or all of the following: reserves, minimum bid increments, whether proxy bidding is enabled, what time the auction is to start and end, what resources are to be auctioned off, and information regarding the potential for price adjustments (e.g., what factors will cause a price adjustment to occur, limits on price adjustments, whether prices can be adjustment upwards, whether prices can be adjusted downwards, whether a bidder can abandon a purchase of a resource if the price is adjusted, or if the price is adjusted more than a certain amount or percentage, etc.).

At state 806, the auction begins. At state 808, bids are received. Bidders are informed whether their bids have been accepted, whether they need to raise their bids to have a winning bid, etc. At state 810, the auction ends. At state 812, the system determines winning bids and allocates resources to the winning bids. At state 814, the system accesses price adjustment parameters from memory and performs the corresponding adjustments. Notifications are sent to the winning bidders informing them of their winning status, the adjusted price for those resources. If there is an abandon purchase option, a link is optionally provided which when activated causes the purchase to be abandoned and a reallocation of the corresponding resource to a lower ranked bidder, if any, to occur. At state 816, the winning bidders that did not abandon their purchase are charged (e.g., against a standing balance, a credit card, via an account withdrawal, etc.) the adjusted prices for the resources. At state 818, the winning bidders are provided with the corresponding resources.

Figure 9:
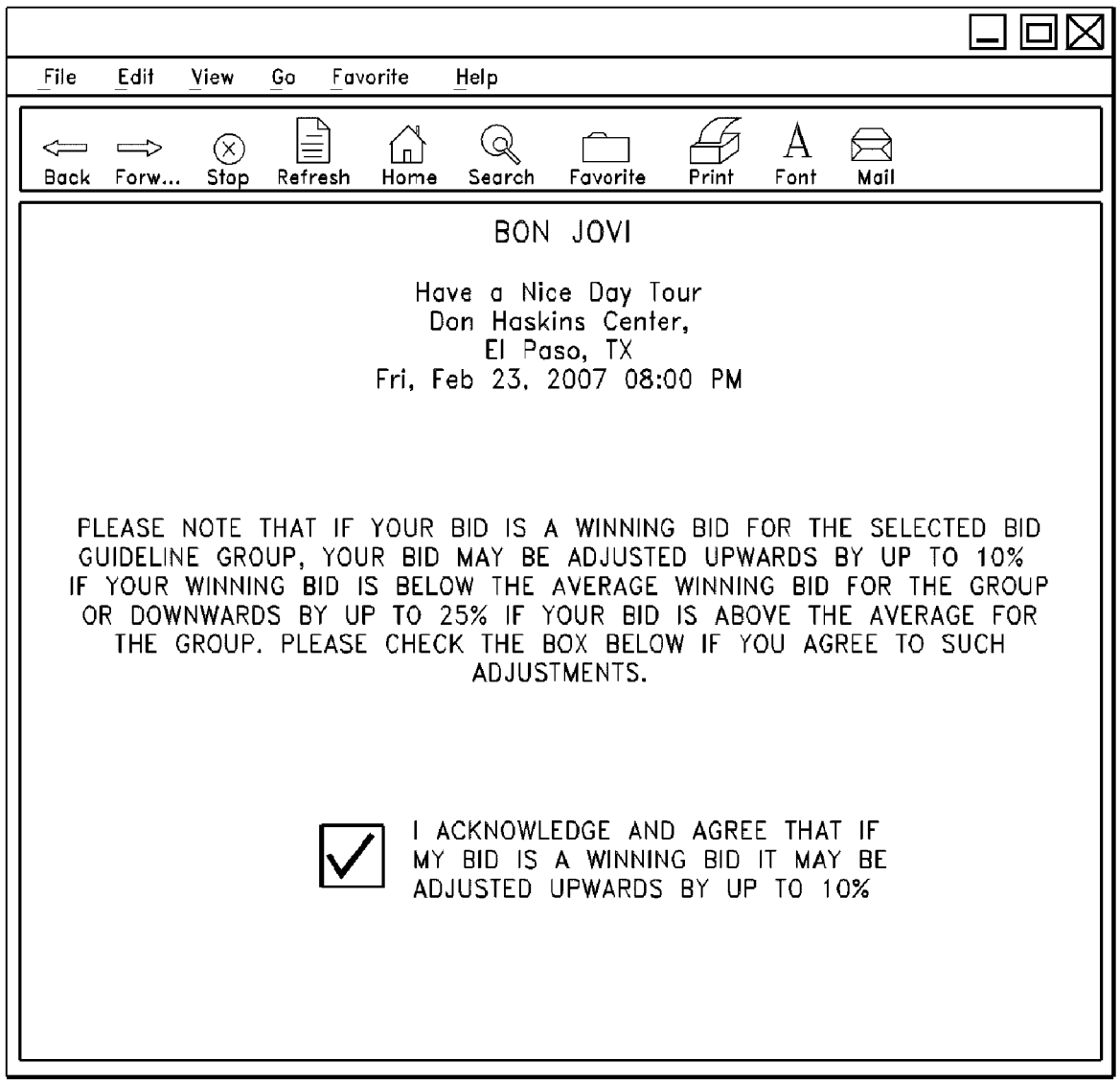
FIGS. 9-10 illustrate additional example user interfaces.
Figure 10:
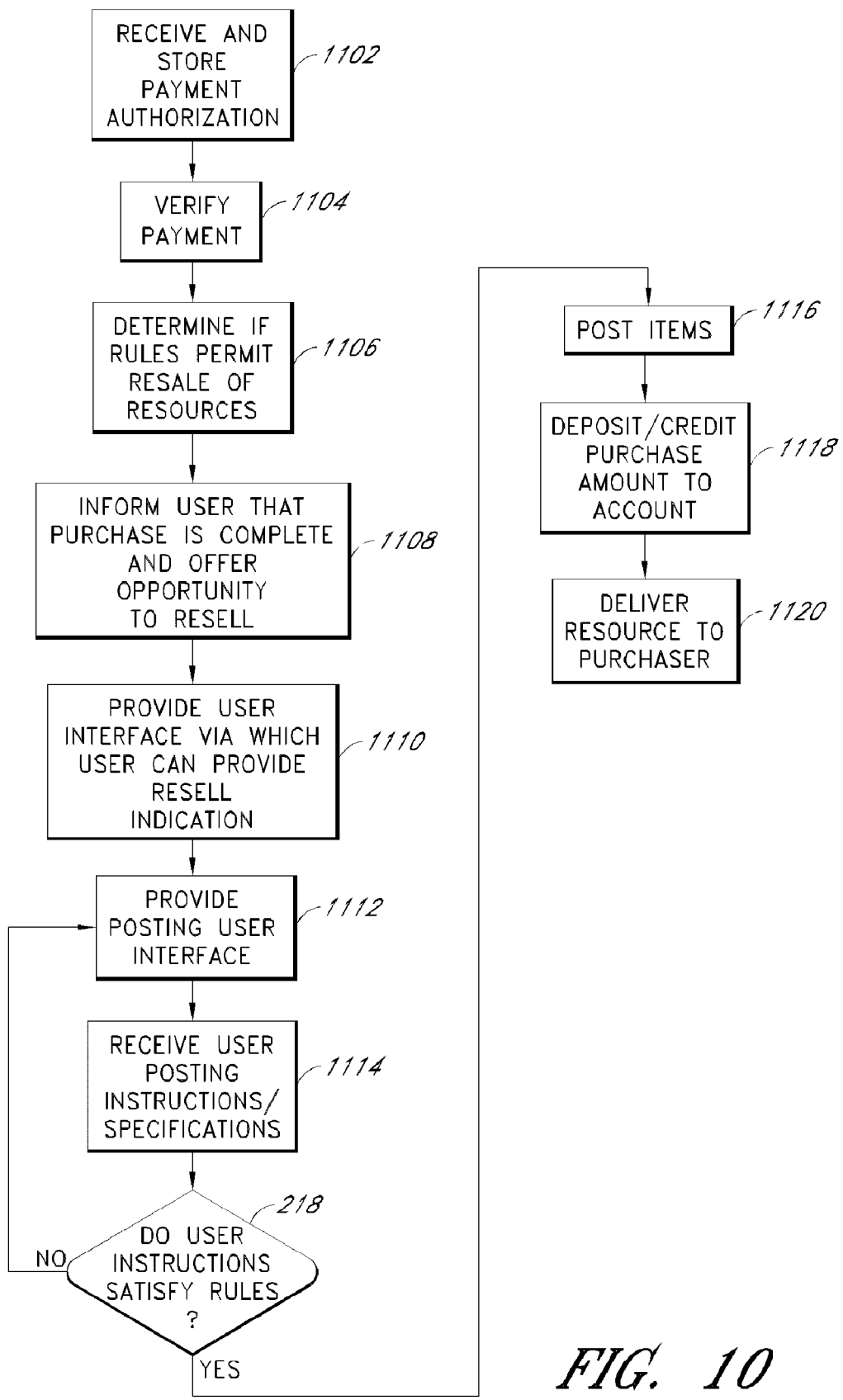

FIG. 9 illustrates an example user interface providing information to a potential bidder regarding price adjustments. In this example, the user is informed that the winning bids may be adjusted up to 10% in the direction of the average unadjusted winning bid. An acceptance check box is provided via which the user can accept the adjustment provision. FIG. 10 illustrates an example user interface informing the user that the user has a winning bid, the amount of the user's winning bid, the average of the winning bids, the amount the user's bid amount has been adjusted in dollars and as a percentage, and the adjusted price the user has paid for the resource.

Figure 11:
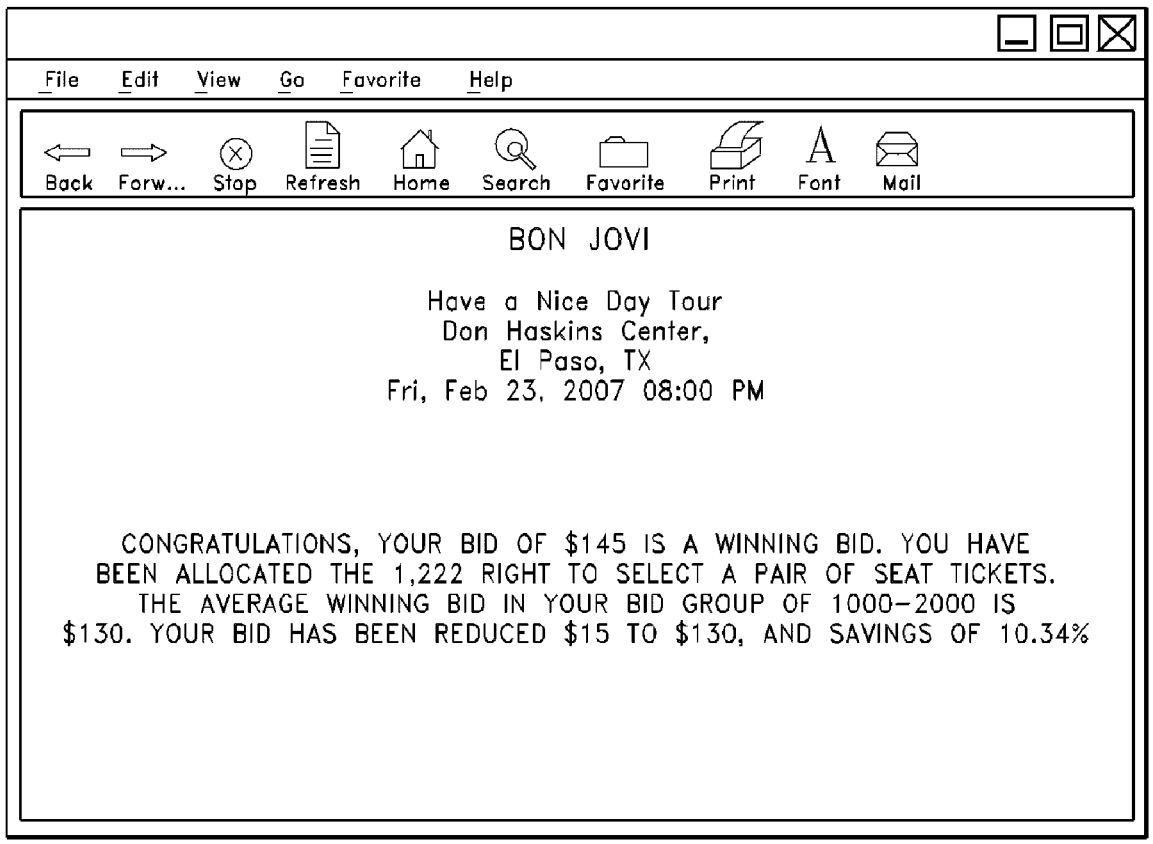
FIG. 11 illustrate a fourth example process.

FIG. 11 illustrates an example process enabling a user to post for resale a resource (or resources) just purchased, such as seat tickets or the right to choose seat tickets. In this example, the user has purchased the resource in a set price sale, although a similar process can be used for purchases made via auctions or otherwise. At state 1102, the user authorizes payment for the resource (e.g., via a terminal such as a personal computer or telephonic device). At state 1104, the system verifies the payment. At state 1106, the system determines if rules (e.g., specified by the system operator and/or the resource seller) stored in computer memory (e.g., in a database that specifies resale rules) allow the resale of the resource, and if so, if there are any limits on the user's ability to resell the resource. For example, the rules can limit how much the user can ask or charge for the resource (e.g., a fixed dollar amount above the face value/original sales price, a percentage of the face value/original sales price, etc.), how many resources the user can resell, whether the resource can be sold at auction (and whether a minimum reserve is required or permitted and/or a specified minimum bid increment) and/or at a set price, and/or other rules. If the rules permit the user to resell the resource, the process proceeds to state 1108.

At state 1108, the system informs the user via a user interface (e.g., presented via the user terminal) that the purchase is complete and asks the user if the user wants to post the purchased resource(s) or a portion thereof, for sale. Thus, optionally, the option for posting a resource for resale is presented during the same transaction and/or web session as the resource purchase. This provides the user with a longer time to resell the resource, and makes it more convenient, as the user does not have to initiate a new session in order to post resource for resale.

If the user indicates that the user wants to post some or all the purchased resources for sale, the process proceeds to state 1110 and a user interface is presented to the user informing the user of the restrictions, if any, that apply to the posting and/or sale of the resources. A control (e.g., a link or button) is provided which the user can activate if the user wants to process with the resource resale. If the user activates the control, the process proceeds to state 1112, and a user interface is presented to the user via which the user can post resources for sale (e.g., on a website).

For example, the interface can provide fields via which the user can indicate which of the resources the user wants to resell, and whether certain resources are being sold as a group. If the rules allow it and the system supports such functionality, optionally the user is provided the ability to specify if resources (individually or in one or more subsets) are to be sold at a set price or at an auction. If the user indicates (e.g., by activating an auction selection control) that the user wants to sell a resource at auction, then an auction posting user interface is presented. By way of example, the auction posting user interface includes fields or controls via which the user can specify a minimum reserve (if allowed), and a minimum bid increment. If the user indicates that a resource is to be sold at a set price, a user interface is presented to the user that includes a field/control via which the user can specify the resource price.

At state 1114, the instructions and specifications provided by the user at state 1112 are received by and stored in system memory. At state 1115, the system verifies that the user instructions and specifications satisfy the corresponding rules. If the user instructions and specifications do not satisfy the corresponding rules, the proceeds to state 1112 and the corresponding form is presented to the user, with text and/or other explanation as to changes the user needs to make for the resale posting to be accepted.

If, at state 1115, it is determined that the user's instructions and specifications satisfy the corresponding rules, the process proceeds to state 1116 and the items are posted for sale (e.g., on a web site hosted by the allocation system). If a successful purchase is made of the resource (e.g., via offers and/or payments made by a purchaser via the hosting website), the process proceeds to state 1118, and the payment is deposited or applied to one or more of the user's accounts (e.g., a bank account, a checking account, a Paypal account, an account maintained by the seller for the user, an account associated with the system operator, etc.), and the resource is no longer posted or has its posted status changed to "sold". At state 1120, the resource is delivered to the purchaser.

Figure 12:
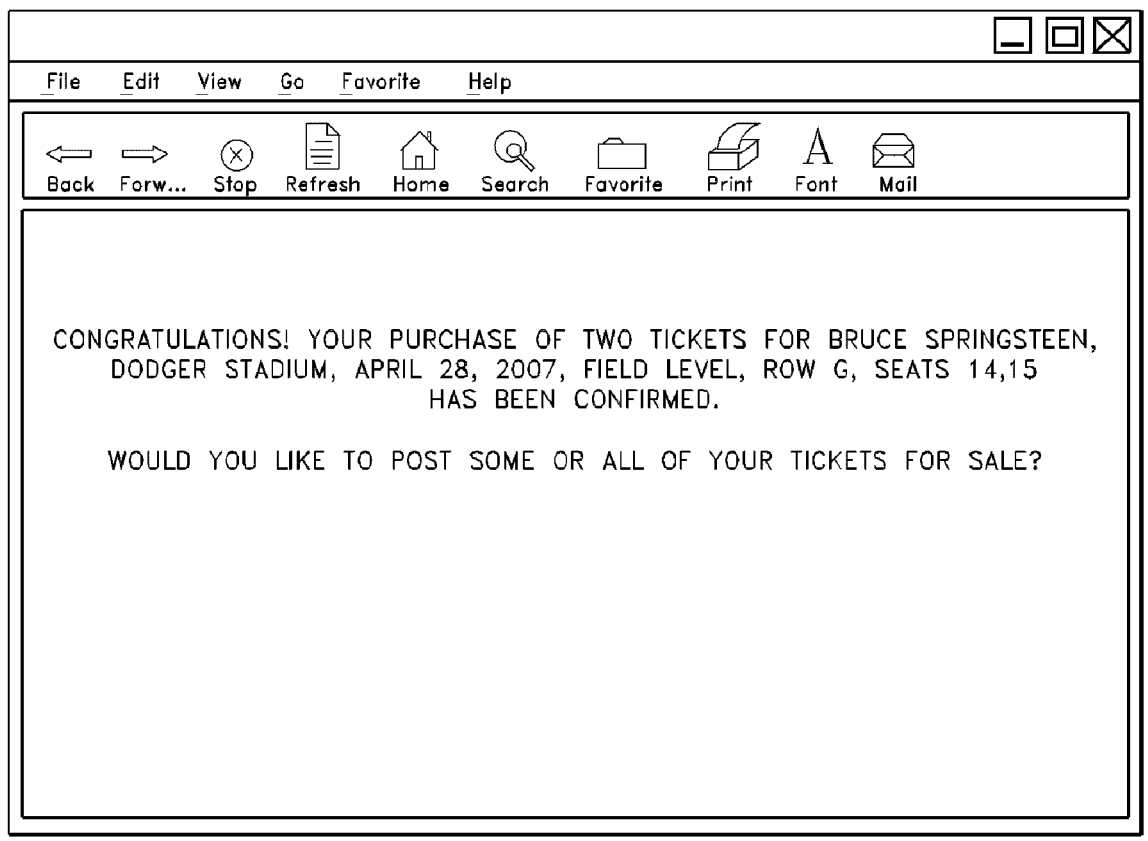
FIG. 12 illustrates another example process.

FIG. 12 illustrates an example user interface presented to a user that has just purchased a resource. The user interface includes a purchase confirmation with respect to the resource, and a control via which the user can initiate a posting for resale of the purchased resource.

Thus, as described above, the processes and systems described herein can provide an enhanced technique for allocating resources via a networked computer system. Certain embodiments efficiently allocate resources in accordance with resource requests. Certain embodiments enable a resource purchaser to offer the resource to others substantially immediately have purchasing the resource. Certain embodiments enable resources to be dynamically priced to more accurately reflect resource values.

While the foregoing detailed description discloses several embodiments of the present invention, it should be understood that this disclosure is illustrative only and is not limiting of the present invention. It should be appreciated that the specific configurations and operations disclosed can differ from those described above, and that the methods described herein can be used in contexts other than ticketing systems.

What is claimed is:

1. A resource allocation system, comprising:
a first network interface;
a load balancer;
a web proxy processor configured to selectively block an inbound user browser request or route an inbound user browser request to a destination server;
a cache cluster system configured to cache data and states for access by one or more system components;
a database storing information regarding a plurality of resources, including rights to select resources rankings; and
program code stored in computer readable memory, which, when executed is configured to:
receive requests from users for the right to select a resource from a pool of resources, wherein the requests are associated with corresponding rankable attributes;
rank the users' requests based at least on the corresponding rankable attributes;
allocate the ranked rights to select resources to at least a portion of the requests based at least in part on the ranking of the users' requests.

2. The system as defined in claim 1, wherein program code, when executed is further configured to transmit to a first user a communication including a first code that identifies a first right to the select.

3. The system as defined in claim 2, wherein program code, when executed is further configured to:

receive at a first chronological time from the first user a first indication that the first user wants to make a resource selection, wherein the first indication is associated with the first code; and determine if the first user is authorized to make a resource selection based at least in part on the first chronological time.

4. The system as defined in claim 2, wherein program code, when executed is further configured to transmit a denial notification to a first requester that had been allocated at least one right to select a resource.

5. The system as defined in claim 4, wherein the denial notification is configured to indicate that the first user is not authorized to make a resource selection at the first chronological time.

6. The system as defined in claim 1, wherein program code, when executed is further configured to transmit to a first user a communication including a first code that identifies a first right to the select, wherein the system is configured to transmit the first code via email.

7. The system as defined in claim 1, wherein program code, when executed is further configured to transmit to a first user a communication including a first code that identifies a first right to the select, wherein system is configured to transmit the first code via an instant message.

8. The system as defined in claim 1, wherein program code, when executed is further configured to transmit to a first user a communication including a first code that identifies a first right to the select wherein system is configured to transmit the first code via an SMS message.

9. The system as defined in claim 1, wherein program code, when executed is further configured to transmit to at least one user a plurality of time windows from which to select.

10. A method of allocating computer resources:
receiving over a network at a resource allocation system requests for one or more rights to select computer resources from processor-based systems, wherein the requests are associated with corresponding rankable criteria;
ranking the requests based on the rankable criteria;
storing in computer readable memory rankings for rights to select resources;
allocating ranked rights to select resources to the requests based at least in part on the rankable criteria;
transmitting over the network information regarding the allocated rights to select to the requesting processor-based systems, the information including time windows in which requestors can perform resource selections;
receiving over the network at a first time from a first requester an indication that the first requester wants to make a resource selection;
determining if the first requester is authorized to make a resource selection during the first time;
if the first requester is authorized to make a resource selection during the first time:
enabling the first requester to select a resource;
receiving over the network a resource selection from the first requester;
removing the selected resource from a pool of available resources.

11. The method as defined in claim 10, wherein if the first requester is not authorized to make a resource selection during the first time, a denial notification is transmitted over the network to the first requester.

12. The method as defined in claim 11, wherein the denial notification informs the first requester of a time window the first requester is authorized to make a resource selection.

13. The method as defined in claim 10, wherein the computer resources include a processor resource.

14. The method as defined in claim 10, wherein the computer resources include includes a memory resource.

15. The method as defined in claim 10, wherein the computer resources include network bandwidth.

16. The method as defined in claim 10, wherein the ranked criteria relate to something of value being offered by requesters.

17. The method as defined in claim 10, the method further comprising informing the first requester of an alternate time window if a first time window allocated to the first requester has passed.

18. The method as defined in claim 10, the method further comprising transmitting to at least one requester a plurality of time windows from which to choose.

19. A method of allocating resources, the method comprising:
receiving from a first processor-based system over a network at a resource allocation system a first request from a first user for the right to select a resource from a pool of resources,
wherein the first request is associated with a first rankable attribute;
receiving from a second processor-based system over the network at the resource allocation system a second request from a second user for the right to select a resource from the pool of resources,
wherein the second request is associated with a second rankable attribute;
ranking the first request and the second request using at least the first rankable attribute and the second rankable attribute;
allocating a first ranked right to select a resource from the pool of resources to the first request and a second ranked right to select a resource from the pool of resources to the second request based at least in part on the ranking of the first request and the ranking of the second request;
transmitting to the first user a communication including a first code that identifies the first ranked right to the select;
transmitting to the second user a communication including a second code that identifies the second ranked right to the select,
wherein the first ranked right to select entitles the first user to make a resource pool selection before second user;
receiving over the network at a first time from the first user a first indication that the first user wants to make a resource selection,
wherein the first indication is associated with the first code;
determining if the first user is authorized to make a resource selection during the first time;
if the first user is authorized to make a resource selection during the first time, enabling the first user to select at least one resource from the pool of resources;
receiving over the network at a second time from the second user a second indication that the second user wants to make a resource selection,
wherein the second indication is associated with the second code;
determining if the second user is authorized to make a resource selection during the first time; and
if the second user is authorized to make a resource selection during the first time, enabling the second user to select a resource from the pool of resources.

20. The method as defined in claim 19, the method further comprising:
   receiving over the network a resource selection from the first user; and
   removing the selected resource the pool of resources.

21. The method as defined in claim 20, the method further comprising transmitting the selected resource to the first processor-based system over the network.

22. The method as defined in claim 20, the method further comprising transmitting a token corresponding to the selected resource to the first user.

23. The method as defined in claim 19, wherein if the first user is not authorized to make a resource selection during the first time, a denial notification is transmitted to the first user.

24. The method as defined in claim 21, wherein the denial notification informs the first user of the time window the first user is authorized to make a resource selection.

25. The method as defined in claim 19, wherein the pool of resources includes the right to use a physical location.

26. The method as defined in claim 19, wherein the pool of resources includes a memory resource.

27. The method as defined in claim 19, wherein the first request is received as an auction submission.

28. The method as defined in claim 19, wherein the first criterion relates to an item of value.

29. The method as defined in claim 19, the method further comprising informing the first user of an alternate time window if a first time window assigned to the first user has passed.

30. The method as defined in claim 19, the method further comprising transmitting to the first user a plurality of time windows from which the first user can select.

31. A resource allocation system, comprising:
   a first network interface;
   a database storing information regarding a plurality of resources, including rights to select resources rankings;
   a computing device; and
   program code stored in computer readable memory, which, when executed by the computing device, is configured to:
      receive requests from users for the right to select a resource from a pool of resources,
      wherein the requests are associated with corresponding rankable attributes;
      rank the users' requests based at least on the corresponding rankable attributes;
      allocate the ranked rights to select resources to at least a portion of the requests based at least in part on the ranking of the users' requests.

32. The system as defined in claim 31, wherein program code, when executed is further configured to transmit to a first user a communication including a first code that identifies a first right to the select.

33. The system as defined in claim 32, wherein program code, when executed is further configured to:
   receive at a first chronological time from the first user a first indication that the first user wants to make a resource selection,
      wherein the first indication is associated with the first code; and
   determine if the first user is authorized to make a resource selection based at least in part on the first chronological time.

34. The system as defined in claim 33, wherein program code, when executed is further configured to transmit a denial notification to the first requester.

35. The system as defined in claim 34, wherein the denial notification is configured to indicate that the first user is not authorized to make a resource selection at the first chronological time.

36. The system as defined in claim 32, wherein system is configured to transmit the first code via email.

37. The system as defined in claim 32, wherein system is configured to transmit the first code via an instant message.

38. The system as defined in claim 32, wherein system is configured to transmit the first code via an SMS message.

39. The system as defined in claim 31, wherein program code, when executed is further configured to transmit to at least one user a plurality of time windows from which to select.

* * * * *

UNITED STATES PATENT AND TRADEMARK OFFICE
CERTIFICATE OF CORRECTION

| | |
|---|---|
| PATENT NO. | : 7,865,598 B2 |
| APPLICATION NO. | : 12/187295 |
| DATED | : January 4, 2011 |
| INVENTOR(S) | : Dennis Denker et al. |

It is certified that error appears in the above-identified patent and that said Letters Patent is hereby corrected as shown below:

Title Page;

(Item 56), Page 2, Col. 2, line 25, Under Other Publications, change "Internate" to --Internet--.

(Item 56), Page 2, Col. 2, line 26, Under Other Publications, change "Univiersity" to --University--.

(Item 56), Page 3, Col. 2, line 40, Under Other Publications, change "retreived" to --retrieved--.

(Item 56), Page 3, Col. 2, line 42, Under Other Publications, change "retreived" to --retrieved--.

Column 2, line 21, Change "requesters" to --requestors--.

Column 6, line 47, Change "purchaser." to --purchaser,--.

Column 7, line 60, Change "overrideable" to --overridable--.

Column 11, line 31, After "right" insert --to--.

Column 12, line 40, Change "resource" to --bidders--.

Column 16, line 58, After "once" delete "the auction".

Column 19, line 61, After "the" insert --user--.

Column 22, line 12, Change "a of" to --of a--.

Column 23, line 38, Change "formula (s)" to --formula(s)--.

Column 23, line 43, After "(if any)" insert --,--.

Column 32, line 4, In Claim 14, after "include" delete "includes".

Signed and Sealed this
Sixth Day of September, 2011

David J. Kappos
*Director of the United States Patent and Trademark Office*